(12) United States Patent
Sprosts et al.

(10) Patent No.: US 7,712,136 B2
(45) Date of Patent: *May 4, 2010

(54) CONTROLLING A MESSAGE QUARANTINE

(75) Inventors: Craig Sprosts, San Francisco, CA (US);
Scot Kennedy, San Bruno, CA (US);
Daniel Quinlan, San Bruno, CA (US);
Larry Rosenstein, San Bruno, CA (US);
Charles Slater, San Bruno, CA (US)

(73) Assignee: IronPort Systems, Inc., San Bruno, CA (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/636,150

(22) Filed: Dec. 7, 2006

(65) Prior Publication Data
US 2007/0083929 A1    Apr. 12, 2007

Related U.S. Application Data

(63) Continuation of application No. 11/418,812, filed on May 5, 2006.

(60) Provisional application No. 60/678,391, filed on May 5, 2005.

(51) Int. Cl.
*G06F 11/00* (2006.01)

(52) U.S. Cl. .................................................. 726/24

(58) Field of Classification Search ............... None
See application file for complete search history.

(56) References Cited

U.S. PATENT DOCUMENTS

| | | | |
|---|---|---|---|
| 5,933,416 A | 8/1999 | Schenkel et al. | |
| 6,052,709 A | 4/2000 | Paul | |
| 6,072,942 A | 6/2000 | Stockwell et al. | |
| 6,119,236 A * | 9/2000 | Shipley | 726/22 |
| 6,546,416 B1 | 4/2003 | Kirsch | |
| 6,654,787 B1 | 11/2003 | Aronson et al. | |
| 6,785,712 B1 | 8/2004 | Hogan et al. | |
| 6,886,099 B1 | 4/2005 | Smithson et al. | |
| 6,941,348 B2 | 9/2005 | Petry et al. | |
| 6,941,466 B2 * | 9/2005 | Mastrianni | 726/22 |
| 7,181,498 B2 | 2/2007 | Zhu et al. | |
| 7,272,853 B2 | 9/2007 | Goodman et al. | |
| 7,305,709 B1 * | 12/2007 | Lymer et al. | 726/25 |
| 7,331,061 B1 | 2/2008 | Ramsey et al. | |
| 7,409,708 B2 | 8/2008 | Goodman et al. | |
| 7,418,733 B2 * | 8/2008 | Connary et al. | 726/25 |
| 7,475,118 B2 | 1/2009 | Leiba et al. | |
| 2002/0004908 A1 * | 1/2002 | Galea | 713/200 |
| 2002/0059418 A1 | 5/2002 | Bird et al. | |

(Continued)

OTHER PUBLICATIONS

Kephart, Jeffrey O., et al., "Biologically Inspired Defenses Against Computer Viruses", International Joint Conference on Artificial Intelligence, 1995, 12 pages.

(Continued)

*Primary Examiner*—Benjamin E Lanier
(74) *Attorney, Agent, or Firm*—Hickman Palermo Truong & Becker LLP

(57) ABSTRACT

Controlling a message quarantine is disclosed. A message scanning method is described in which early exit from parsing and scanning can occur by matching threat rules only to selected message elements and stopping rule matching as soon as a match on one message element exceeds a threat threshold.

19 Claims, 11 Drawing Sheets

U.S. PATENT DOCUMENTS

| | | | |
|---|---|---|---|
| 2003/0050988 | A1 | 3/2003 | Kucherawy |
| 2003/0115485 | A1 | 6/2003 | Milliken |
| 2003/0167402 | A1 | 9/2003 | Stolfo et al. |
| 2003/0185391 | A1 | 10/2003 | Qi et al. |
| 2004/0117648 | A1* | 6/2004 | Kissel ................. 713/200 |
| 2004/0186891 | A1 | 9/2004 | Panec et al. |
| 2004/0199592 | A1 | 10/2004 | Gould et al. |
| 2004/0210422 | A1 | 10/2004 | Takahashi et al. |
| 2005/0060295 | A1 | 3/2005 | Gould et al. |
| 2005/0060643 | A1 | 3/2005 | Glass et al. |
| 2005/0091319 | A1 | 4/2005 | Kirsch |
| 2005/0246440 | A1 | 11/2005 | Yu |
| 2005/0259644 | A1 | 11/2005 | Huitema et al. |
| 2005/0283837 | A1 | 12/2005 | Olivier et al. |
| 2006/0095410 | A1 | 5/2006 | Ostrover et al. |
| 2006/0168006 | A1 | 7/2006 | Shannon et al. |
| 2009/0019126 | A1 | 1/2009 | Adkins |

OTHER PUBLICATIONS

International Searching Authority, "Notification of Transmittal of the International Search Report and the Written Opinion of the International Searching Authority, or the Declaration," dated Jan. 8, 2007, PCT/US05/19038, 6 pgs.

PCT/US05/19038—current claims, 24 pgs.

Klensin, J., "Simple mail Transfer Protocol," Network Working Group, RFC 2821, dated Apr. 2001, 79 pages.

International Searching Authority, "Notification of Transmittal of the International Search Report and the Written Opinion of the International Searching Authority, or the Declaration," PCT/US05/18999, Feb. 6, 2007, 8 pages.

Current Claims, PCT/US05/18999, 14 pages.

International Bureau, "International Preliminary Report on Patentability," PCT/US2005/018999, dated Feb. 28, 2007, 5 pages.

Current Claims, PCT/US2005/018999, 14 pages.

Mertz, David, "Spam Filtering Techniques", Aug. 2002, 8 pages.

Harris, E., "GreyListing Whitepaper" (2003) http://projects.puremagic.com/greylisting/whitepaper.html (20 pages).

Ironport Messaging Gateway Appliances: http://web.archive.org/web/20030421095627/http://ironport.com/http://web.archive.org/web/20030405102438/www.senderbase.com/http://web.archive.org/web/20030724022036/www.ironport.com/pdf/ironport_c60_brochure.pdf (17 pages). 2003

Microsoft Computer Dictionary, Fifth Edition (May 2002) ISBN-10: 0-7356-1495-4 ISBN-13: 978-0-7356-1495-6 (5 pages).

CAPSA- Packet. Inspector: http://web.archive.org/web20030118193455/http://www.javvin.com/packet.html http://web.archive.org/web/20030416233408/http:/javvin.com/packet.html, 10 pages.

* cited by examiner

CONTROLLING A MESSAGE QUARANTINE

PRIORITY CLAIM AND RELATED APPLICATION

This application claims benefit under 35 U.S.C. §120 as a Continuation of prior application Ser. No. 11/418,812, filed May 5, 2006, which claims benefit of Provisional Appln. 60/678,391, filed May 5, 2005, the entire contents of which are hereby incorporated by reference as if fully set forth herein.

FIELD OF THE INVENTION

The present invention generally relates to detecting threats in electronic messages such as computer viruses, spam, and phishing attacks. The invention relates more specifically to techniques for responding to new occurrences of threats in electronic messages, managing a quarantine queue of threat-bearing messages, and scanning messages for threats.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The recurring outbreak of message-borne viruses in computers linked to public networks has become a serious problem, especially for business enterprises with large private networks. Direct and indirect costs of thousands of dollars may arise from wasted employee productivity, capital investment to buy additional hardware and software, lost information because many viruses destroy files on shared directories, and violation of privacy and confidentiality because many viruses attach and send random files from a user's computer.

Further, damage from viruses occurs over a very short time period. A very high percentage of machines in an enterprise network can be infected between the time that the virus breaks out and the time virus definitions are published and deployed at an enterprise mail gateway that can detect and stop virus-infected messages. The window of time between "outbreak" and "rule deployment" is often five (5) hours or more. Reducing reaction time would be enormously valuable.

In most virus outbreaks, executable attachments now serve as a carrier of virus code. For example, of 17 leading virus outbreaks in the last three years, 13 viruses were sent through email attachments. Twelve of the 13 viruses sent through email attachments were sent through dangerous attachment types. Thus, some enterprise network mail gateways now block all types of executable file attachments.

Apparently in response, virus writers are now hiding executables. Increasingly, virus writers are hiding known dangerous file types in files that appear to be innocent. For example, a virus writer may embed executables within .zip files of the type generated by WinZIP and other archive utilities. Such .zip files are very commonly used by enterprises to compress and share larger files, so most enterprises are unwilling or unable to block .zip files. It is also possible to embed executables in Microsoft Word and some versions of Adobe Acrobat.

Based on the foregoing, there is a clear need for an improved approach for managing virus outbreaks. Present techniques for preventing delivery of mass unsolicited commercial email ("spam") and messages that contain other forms of threats, such as phishing attacks, are also considered inadequate. Present techniques for scanning messages for threats are also considered inefficient and in need of improvement.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
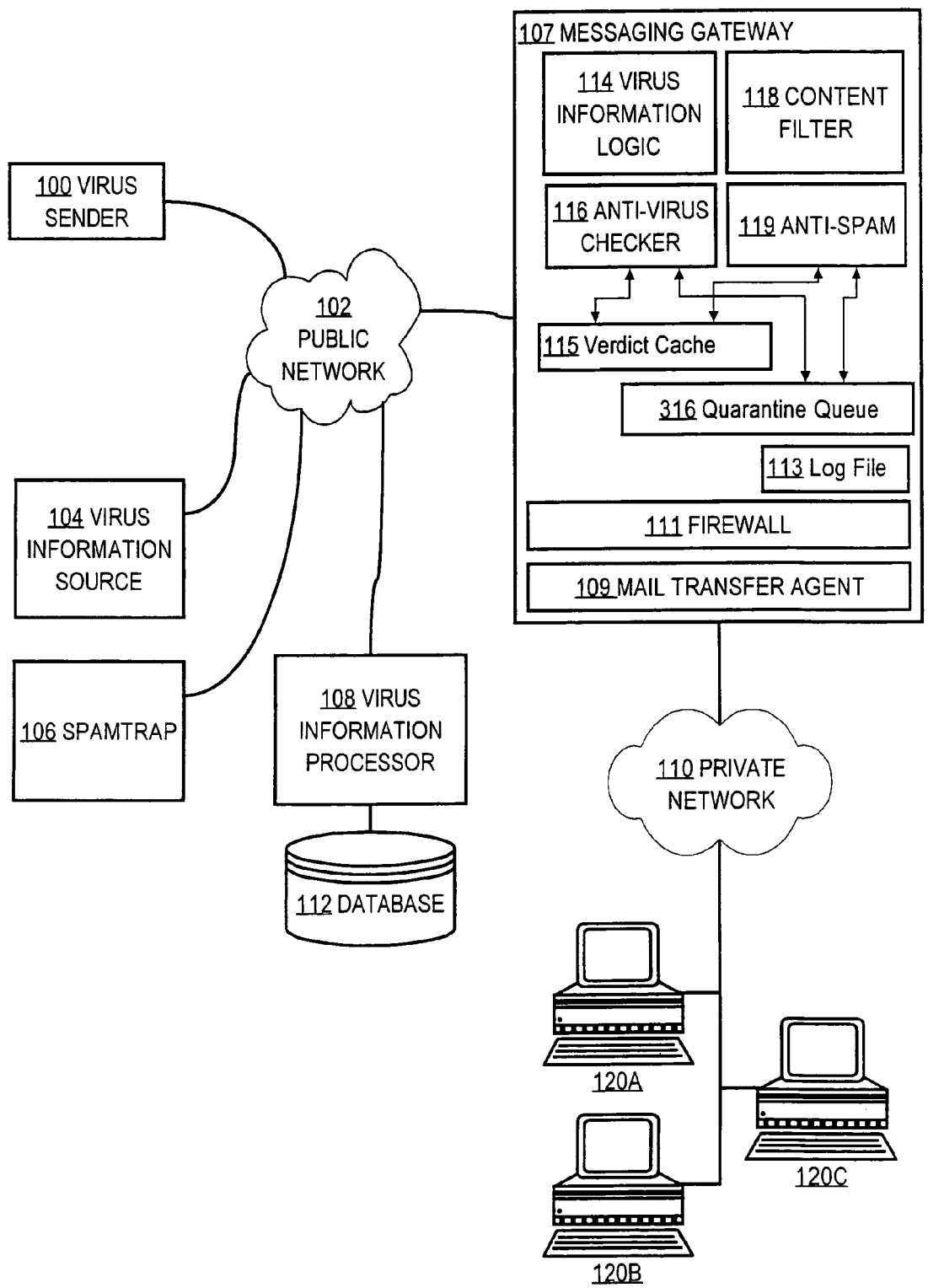
FIG. 1 is a block diagram of a system for managing computer virus outbreaks, according to an embodiment.

A method and apparatus for managing computer virus outbreaks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Virus Outbreak Control Approaches—First Embodiment—Structural and Functional Overview
   2.1 Network System and Virus Information Sources
   2.2 Counting Suspicious Messages
   2.3 Processing Messages Based on Virus Outbreak Information
   2.4 Generating Virus Outbreak Information
   2.5 Using Virus Outbreak Information
   2.6 Additional Features
   2.7 Example Use Cases
3.0 Approaches for Blocking Spam Messages
   3.1 Early Exit from Spam Scanning
   3.2 Spam Scan Verdict Caching 4.0 Methods of Detection of Viruses Based on Message Heuristics, Sender Information, Dynamic Quarantine Operation, and Fine-Grained Rules
  4.1 Detecting Using Message Heuristics
  4.2 Sender-Based Detection Of Viruses
  4.3 Dynamic Quarantine Operations Including Rescanning
  4.4 Fine-Grained Rules
  4.5 Communication of Messaging Gateways with Service Provider
  4.6 Outbound Whitelist Module
5.0 Implementation Mechanisms—Hardware Overview
6.0 Extensions and Alternatives

1.0 General Overview

The needs identified in the foregoing Background, and other needs and objects that will become apparent for the following description, are achieved in the present invention, which comprises, in one aspect, a method comprising receiving an electronic mail message having a destination address for a recipient account; determining a virus score value for the message based upon one or more rules that specify attributes of messages that are known to contain computer viruses, wherein the attributes comprise a type of file attachment to the message, a size of the file attachment, and one or more heuristics based on the message sender, subject or body and other than file attachment signatures; when the virus score value is greater than or equal to a specified threshold, storing the message in a quarantine queue without immediately delivering the message to the recipient account.

In another aspect, the invention provides a method comprising receiving an electronic mail message having a destination address for a recipient account; determining a threat score value for the message; when the threat score value is greater than or equal to a specified threat threshold, storing the message in a quarantine queue without immediately delivering the message to the recipient account; releasing the message from the quarantine queue in other than first-in-first-out order upon any of a plurality of quarantine exit criteria, wherein each quarantine exit criterion is associated with one or more exit actions; and upon a particular exit criterion, selecting and performing the associated one or more exit actions.

In another aspect, the invention provides a method comprising receiving and storing a plurality of rules specifying characteristics of electronic messages that indicate threats associated with the messages, wherein each rule has a priority value, wherein each rule is associated with a message element type; receiving an electronic mail message having a destination address for a recipient account, wherein the message comprises a plurality of message elements; extracting a first message element; determining a threat score value for the message by matching only the first message element to only selected rules having a message element type corresponding to the first message element, and according to an order of the priorities of the selected rules; when the threat score value is greater than a specified threshold, outputting the threat score value.

In these approaches, early detection of computer viruses and other message-borne threats is provided by applying heuristic tests to message content and examining sender reputation information when no virus signature information is available. As a result, a messaging gateway can suspend delivery of messages early in a virus outbreak, providing sufficient time for updating an anti-virus checker that can strip virus code from the messages. A dynamic and flexible threat quarantine queue is provided with a variety of exit criteria and exit actions that permits early release of messages in other than first in, first-out order. A message scanning method is described in which early exit from parsing and scanning can occur by matching threat rules only to selected message elements and stopping rule matching as soon as a match on one message element exceeds a threat threshold.

In other aspects, the invention encompasses a computer apparatus and a machine-readable medium configured to carry out the foregoing steps.

2.0 Virus Outbreak Control System

First Embodiment—Structural and Functional Overview 2.1 Network System and Virus Information Sources FIG. 1 is a block diagram of a system for managing computer virus outbreaks, according to an embodiment. A virus sender 100, whose identity and location are typically unknown, sends a message infected with a virus, typically in an electronic message, or email, with a virus-bearing executable file attachment, to public network 102, such as the Internet. The message is either addressed to, or propagates by action of the virus to, a plurality of destinations such as virus information source 104 and spamtrap 106. A spamtrap is an email address or an email mailbox used to collect information about unsolicited email messages. The operation and implementation of virus information source 104 and spamtrap 106 is discussed in further detail below. For purposes of illustrating a simple example, FIG. 1 shows only two destinations in the form of virus information source 104 and spamtrap 106, but in a practical embodiment there may be any number of such sources of virus information.

The virus sender 100 may obtain network addresses of virus information source 104 and spamtrap 106 from public sources, or by sending the virus to a small number of known addresses and letting the virus propagate.

A virus information processor 108 is communicatively coupled to public network 102 and can receive information from the virus information source 104 and spamtrap 106. Virus information processor 108 implements certain functions described further herein including collecting virus information from virus information source 104 and spamtrap 106, generating virus outbreak information, and storing the virus outbreak information in a database 112.

A messaging gateway 107 is coupled, directly or indirectly through a firewall 111 or other network elements, from public network 102 to a private network 110 that includes a plurality of end stations 120A, 120B, 120C. Messaging gateway 107 may be integrated with a mail transfer agent 109 that processes email for private network 110, or the mail transfer agent may be deployed separately. For example, an IronPort Messaging Gateway Appliance (MGA), such as model C60, C30, or C10, commercially available from IronPort Systems, Inc., San Bruno, Calif., may implement mail transfer agent 109, firewall 111, and the functions described herein for messaging gateway 107.

In an embodiment, messaging gateway 107 includes virus information logic 114 for obtaining virus outbreak information from virus information processor 108 and processing messages destined for end stations 120A, 120B, 120C according to policies that are set at the messaging gateway. As further described herein, the virus outbreak information can include any of a number of types of information, including but not limited to, a virus score value and one or more rules that associate virus score values with message characteristics that are associated with viruses. As further described herein with respect to FIG. 3, such virus information logic may be integrated with a content filter function of messaging gateway 107.

In an embodiment, virus information logic 114 is implemented as an independent logical module in messaging gateway 107. Messaging gateway 107 invokes virus information logic 114 with message data and receives a verdict in response. The verdict may be based on message heuristics. Message heuristics score messages and determine the likelihood that a message is a virus.

Virus information logic 114 detects viruses based in part on parameters of messages. In an embodiment, virus detection is performed based upon any one or more of: heuristics of mail containing executable code; heuristics of mismatched message headers; heuristics of mail from known Open Relays; heuristics of mail having mismatched content types and extensions; heuristics of mail from dynamic user lists, blacklisted hosts, or senders known to have poor reputations; and sender authenticity test results. Sender authenticity tests results may be generated by logic that receives sender ID values from public networks.

Messaging gateway 107 may also include an anti-virus checker 116, a content filter 118, and anti-spam logic 119. The anti-virus checker 116 may comprise, for example, Sophos anti-virus software. The content filter 118 provides logic for restricting delivery or acceptance of messages that contain content in a message subject or message body that is unacceptable according to a policy associated with private network 110.

The anti-spam logic 119 scans inbound messages to determine if they are unwanted according to a mail acceptance policy, such as whether the inbound messages are unsolicited commercial email, and the anti-spam logic 119 applies policies to restrict delivery, redirect, or refuse acceptance of any unwanted messages. In an embodiment, anti-spam logic 119 scans messages and returns a score of between 0 and 100 for each message indicating a probability that the message is spam or another type of unwanted email. Score ranges are associated with an threshold, definable by an administrator, of possible spam and likely spam against which users can apply a specified set of actions described further below. In an embodiment, messages scoring 90 or above are spam and messages scoring 75-89 are suspected spam.

In an embodiment, anti-spam logic 119 determines a spam score based at least in part upon reputation information, obtained from database 112 or an external reputation service such as SenderBase from IronPort Systems, Inc., that indicates whether a sender of the message is associated with spam, viruses, or other threats. Scanning may comprise recording an X-header in the scanned message that verifies that the message was successfully scanned, and includes an obfuscated string that identifies rules that matched for the message. Obfuscation may comprise creating a hash of rule identifiers based on a private key and a one-way hash algorithm. Obfuscation ensures that only a specified party, such as service provider 700 of FIG. 7, can decode the rules that matched, improving security of the system.

The private network 110 may be an enterprise network associated with a business enterprise or any other form of network for which enhanced security or protection is desired. Public network 102 and private network 110 may use open standard protocols such as TCP/IP for communication.

Virus information source 104 may comprise another instance of a messaging gateway 107 that is interposed between public network 102 and another private network (not shown for clarity) for purposes of protecting that other private network. In one embodiment, virus information source 104 is an IronPort MGA. Spamtrap 106 is associated with one or more email addresses or email mailboxes associated with one or more domains. Spamtrap 106 is established for the purpose of receiving unsolicited email messages, or "spam," for analysis or reporting, and is not typically used for conventional email communication. For example, a spamtrap can be an email address such as "dummyaccountforspam@mycompany.com," or the spamtrap can be a collection of email addresses that are grouped into a mail exchange (MX) domain name system (DNS) record for which received email information is provided. Mail transfer agent 109, or the mail transfer agent of another IronPort MGA, may host spamtrap 106.

In an embodiment, virus information source 104 generates and provides information to virus information processor 108 for use in managing computer virus outbreaks, and the virus information processor 108 can obtain information from spamtrap 106 for the same purpose. For example, virus information source 104 generates counts of received messages that have suspicious attachments, and provides the counts to virus information processor 108, or allows an external process to retrieve the counts and store them in a specialized database. Messaging gateway 107 also may serve as a virus information source by detecting messages that have indications that are associated with viruses or that are otherwise suspicious, creating a count of suspicious messages received in a particular time period, and periodically providing the count to virus information processor 108.

As a specific example, the functions described herein may be implemented as part of a comprehensive message data collection and reporting facility, such as the SenderBase service from IronPort Systems, Inc. In this embodiment, virus information processor 108 can retrieve or receive information from virus information source 104 and spamtrap 106, generate counts of messages that have suspicious attachments or other virus indicators, and update database 112 with the counts and generate virus outbreak information for later retrieval and use by virus information logic 114 of messaging gateway 107. Methods and apparatus relating to the SenderBase service are described in co-pending application Ser. No. 10/857,641, filed May 28, 2004, entitled TECHNIQUES FOR DETERMINING THE REPUTATION OF A MESSAGE SENDER, of Robert Brahms et al., the entire contents of which are hereby incorporated by reference as if fully set forth herein.

Additionally or alternatively, virus information source 104 may comprise the SpamCop information service that is accessible at domain "spamcop.net" on the World Wide Web, or users of the SpamCop service. Virus information source 104 may comprise one or more Internet service providers or other high-volume mail receivers.

The SenderBase and SpamCop services provide a powerful data source for detecting viruses. The services track information about millions of messages per day through spamtrap addresses, end-user complaint reporters, DNS logs, and third-party data sources. This data can be used to detect viruses in a rapid manner using the approaches herein. In particular, the number of messages with specific attachment types, relative to normal levels, sent to legitimate or spamtrap addresses, and not identified as viruses by anti-virus scanners, provides an early warning indicator that a virus outbreak has occurred based on a new virus that is not yet known and detectable by the anti-virus scanners.

In another alternative embodiment, as a supplement to the automatic approaches herein, virus information source 104 may comprise the manual review of data that is obtained by information services consultants or analysts, or external sources. For example, a human administrator monitoring alerts from anti-virus vendors, third-party vendors, security mailing lists, spamtrap data and other sources can detect viruses well in advance of when virus definitions are published in most cases.

Once a virus outbreak is identified based on the virus outbreak information, a network element such as messaging gateway 107 can provide various options for handling a message based on the probability that it is a virus. When the messaging gateway 107 is integrated with a mail transfer agent or mail gateway, the gateway can act on this data immediately. For example, the mail transfer agent 109 can delay message delivery into private network 110 until a virus update is received from an anti-virus vendor and installed on messaging gateway 107 so that the delayed messages can be scanned by anti-virus checker 116 after the virus update is received.

Delayed messages may be stored in a quarantine queue 316. Messages in quarantine queue 316 may be released and delivered according to various policies as further described, deleted, or modified prior to delivery. In an embodiment, a plurality of quarantines 316 are established in messaging gateway 107, and one quarantine is associated with each recipient account for a computer 120A, 120B, etc., in the managed private network 110.

Although not shown in FIG. 1, virus information processor 108 can include or be communicatively coupled to a virus outbreak operation center (VOOC), a receiving virus score (RVS) processor, or both. The VOOC and RVS processor can be separate from virus information processor 108 but communicatively coupled to database 112 and public network 102. The VOOC can be implemented as a staffed center with personnel available 24 hours a day, 7 days a week to monitor the information collected by virus information processor 108 and stored in database 112. The personnel staffing the VOOC can take manual actions, such as issuing virus outbreak alerts, updating the information stored in database 112, publishing virus outbreak information so that messaging gateways 107 can access the virus outbreak information, and manually initiating the sending of virus outbreak information to messaging gateway 107 and other messaging gateways 107.

Additionally, the personnel staffing the VOOC may configure the mail transfer agent 109 to perform certain actions, such as delivering a "soft bounce." A soft bounce is performed when the mail transfer agent 109 returns a received message based on a set of rules accessible to the mail transfer agent 109. More specifically, when the mail transfer agent 109 completes a SMTP transaction by accepting an email message from a sender, the mail transfer agent 109 determines, based on a set of stored software rules accessible to the mail transfer agent 109, that the received message is unwanted or undeliverable. In response to the determination that the received message is unwanted or undeliverable, the mail transfer agent 109 returns the message to the bounce email address specified by the sender. When the mail transfer agent 109 returns the message to the sender, the mail transfer agent 109 may strip the message of any attachments.

In some implementations, virus outbreak information is made available, or published, in response to a manual action taken by personnel, such as those staffing the VOOC. In other implementations, virus outbreak information is automatically made available according to the configuration of the virus information processor, VOOC, or RVS, and then the virus outbreak information and the automated actions taken are subsequently reviewed by personnel at the VOOC who can make modifications, if deemed necessary or desirable.

In an embodiment, the staffing personnel at a VOOC or components of a system according to an embodiment may determine whether a message contains a virus based on a variety of factors, such as (a) patterns in receiving messages with attachments, (b) risky characteristics of attachments to received messages, (c) published vendor virus alerts, (d) increased mailing list activity, (e) risky source-based characteristics of messages, (f) the percentage of dynamic network addresses associated with sources of received messages, (g) the percentage of computerized hosts associated with sources of received messages, and (h) the percentage of suspicious volume patterns.

Each of the above factors may include a variety of criteria. For example, the risky characteristics of attachments to received messages may be based on a consideration of how suspicious the filename of the attachment is, whether the file is associated with multiple file extensions, the amount of similar file sizes attached to received messages, the amount of similar file names attached to received messages, and the names of attachments of known viruses. The patterns in receiving messages with attachments may be based on a consideration of the current rate of the number of messages containing attachments, the trend in the number of messages received with risky attachments, and the number of customer data sources, virus information source 104, and spamtraps 106 that are reporting increases in messages with attachments.

In addition, the determination of whether a message contains a virus may be based on information sent from a client, e.g., information may be reported from a user to a system using an email message that is received at the system in a safe environment, such that the message receptor of the system is configured, as best possible, to prevent the spread of a computer virus to other parts of the system if the message receptor is infected with a virus.

The RVS processor can be implemented as an automated system that generates the virus outbreak information, such as in the form of virus score values for various attachment types or in the form of a set of rules that associate virus score values with message characteristics, to be made available to messaging gateway 107 and other messaging gateways 107.

In an embodiment, messaging gateway 107 comprises a verdict cache 115 that provides local storage of verdict values from anti-virus checker 116 and/or anti-spam logic 119 for re-use when duplicate messages are received. The structure and function of verdict cache 115 is described further below. In an embodiment, messaging gateway 107 comprises a log file 113 that can store statistical information or status messages relating to functions of the messaging gateway. Examples of information that can be logged include message verdicts and actions taken as a result of verdicts; rules that matched on messages, in obfuscated format; an indication that scanning engine updates occurred; an indication that rule updates occurred; scanning engine version numbers, etc.

2.2 Counting Suspicious Messages

Figure 2:
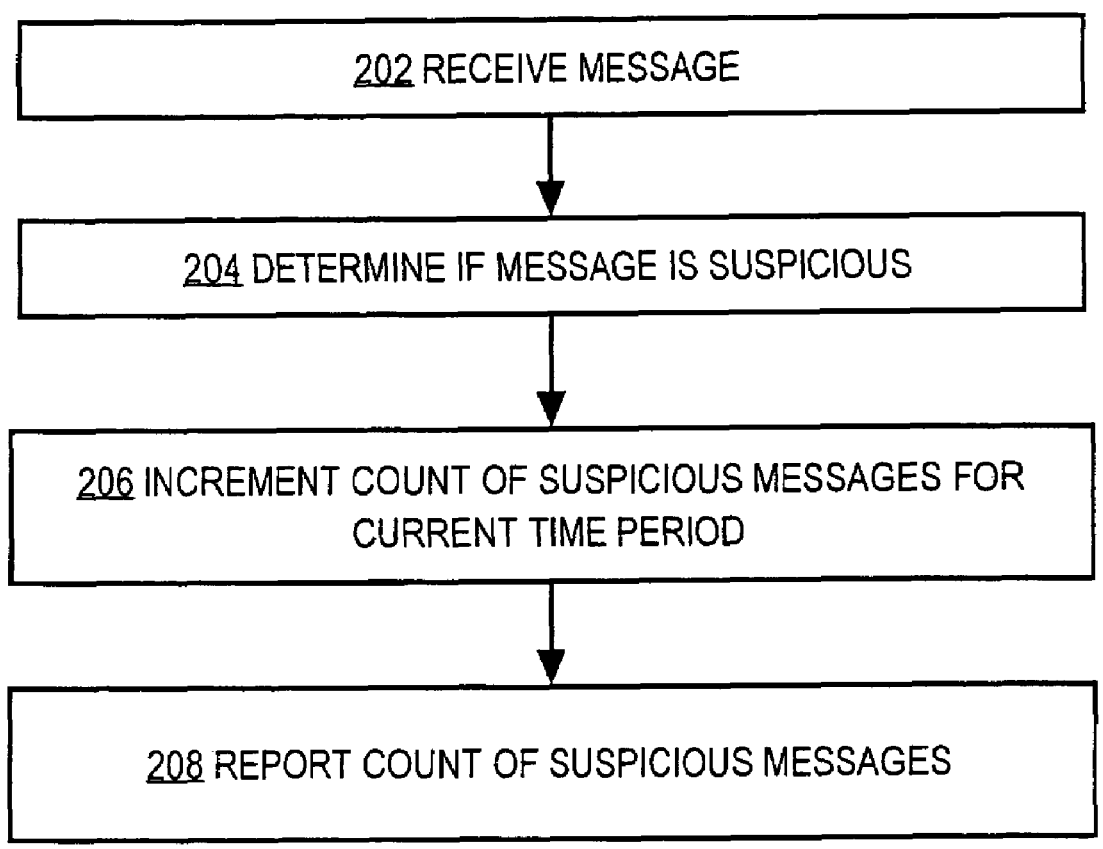
FIG. 2 is a flow diagram of a process of generating a count of suspicious messages, as performed by a virus information source, according to an embodiment.

FIG. 2 is a flow diagram of a process of generating a count of suspicious messages, according to an embodiment. In one implementation, the steps of FIG. 2 may be performed by a virus information source, such as virus information source 104 in FIG. 1.

In step 202, a message is received. For example, virus information source 104 or messaging gateway 107 receives the message sent by virus sender 100.

In step 204, a determination is made about whether the message is risky. In one embodiment, a message is determined to be risky if a virus checker at the virus information source 104 or messaging gateway 107 scans the message without identifying a virus, but the message also includes a file attachment having a file type or extension that is known to be risky. For example, MS Windows (XP Pro) file types or extensions of COM, EXE, SCR, BAT, PIF, or ZIP may be considered risky since virus writers commonly use such files for malicious executable code. The foregoing are merely examples of file types or extensions that can be considered risky; there are more than 50 known different file types.

The determination that a message is suspicious also may be made by extracting a source network address from the message, such as a source IP value, and issuing a query to the SenderBase service to determine whether the source is known to be associated with spam or viruses. For example, a reputation score value provided by the SenderBase service may be taken into account in determining whether a message is suspicious. A message may also be determined to be suspicious if it was sent from an IP address associated with a host known to be compromised, that has a history of sending viruses, or has only recently started sending email to the Internet. The determination also may be based upon one or more of the following factors: (a) the type or extension of a file attachment that is directly attached to the message, (b) the type or extension of a file that is contained within a compressed file, an archive, a .zip file, or another file that is directly attached to the message, and (c) a data fingerprint obtained from an attachment.

In addition, the determination of suspicious messages can be based on the size of an attachment for a suspicious message, the contents of the subject of the suspicious message, the contents of the body of the suspicious message, or any other characteristic of the suspicious message. Some file types can be embedded with other file types. For example, ".doc" files and ".pdf" files may be embedded with other image files types, such as ".gif" or .bmp". Any embedded file types within a host file type may be considered when determining whether a message is suspicious. The characteristics of the suspicious messages can be used in formulating the rules that are provided or made available to the messaging gateways 107 and that include the virus score value that is associated with one or more such characteristics.

In step 206, if the message is suspicious, then a count of suspicious messages for the current time period is incremented. For example, if the message has an EXE attachment, a count of messages with EXE attachments is incremented by one.

In step 208, the count of suspicious messages is reported. For example, step 208 may involve sending a report message to the virus information processor 108.

In an embodiment, virus information processor 108 receives numerous reports such as the report of step 208, continuously in real time. As reports are received, virus information processor 108 updates database 112 with report data, and determines and stores virus outbreak information. In one embodiment, the virus outbreak information includes a virus score value that is determined according to a sub-process that is described further with reference to FIG. 4 below.

2.3 Processing Messages Based on Virus Outbreak Information

Figure 3:
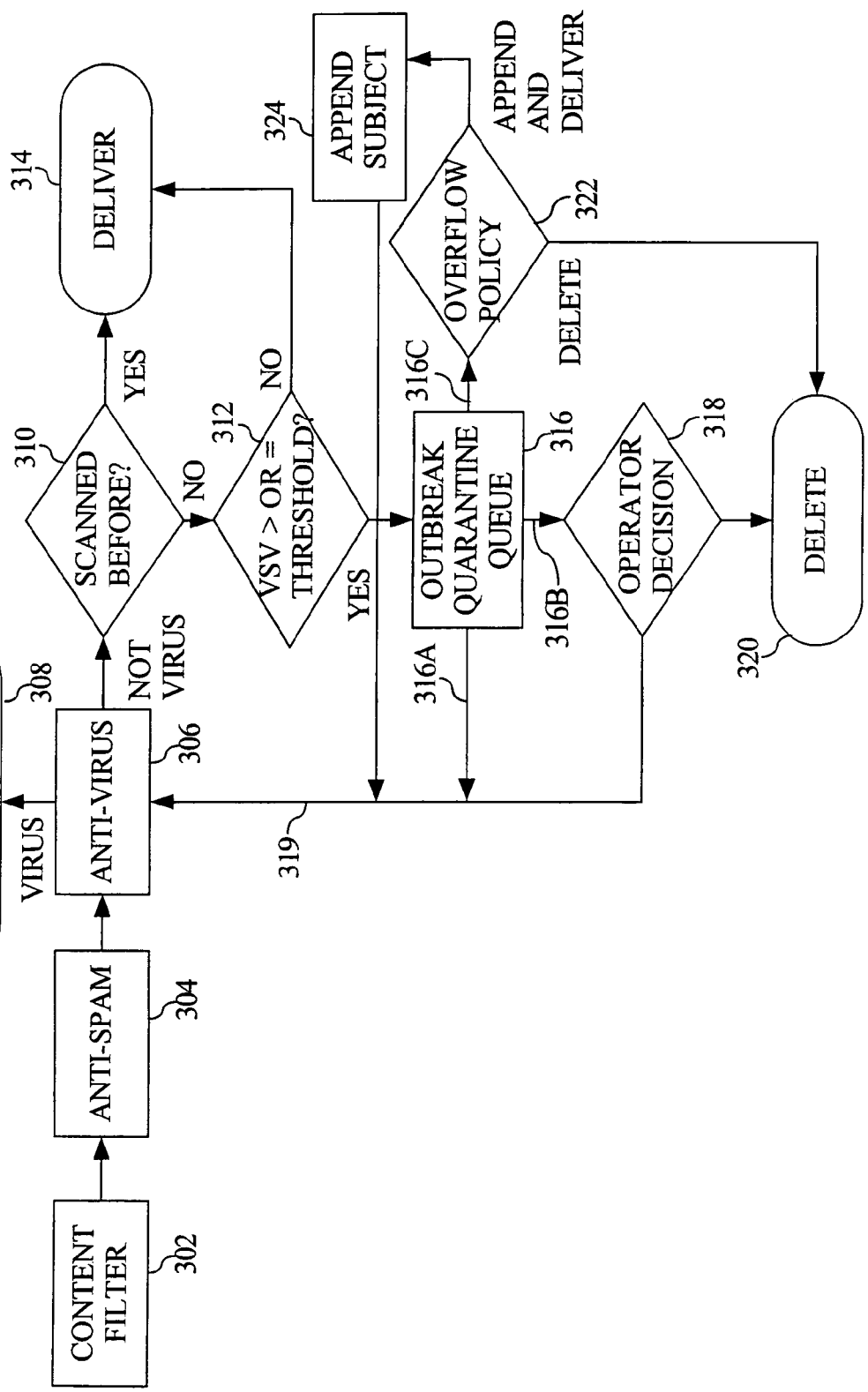
FIG. 3 is a data flow diagram illustrating processing of messages based on virus outbreak information, according to an embodiment.

FIG. 3 is a data flow diagram illustrating processing of messages based on virus outbreak information, according to an embodiment. In one implementation, the steps of FIG. 3 may be performed by an MGA, such as messaging gateway 107 in FIG. 1. Advantageously, by performing the steps illustrated in FIG. 3, a message may be acted upon before it is positively determined to contain a virus.

At block 302, a content filter is applied to the message. Applying a content filter involves, in one embodiment, examining the message subject, other message header values, and the message body, determining whether one or more rules for content filtering are satisfied by the content values, and taking one or more actions when the rules are satisfied, such as may be specified in a content policy. The performance of block 302 is optional. Thus, some embodiments may perform block 302, while other embodiments may not perform block 302.

Further, at block 302 virus outbreak information is retrieved for use in subsequent processing steps. In one embodiment, at block 302 a messaging gateway 107 that implements FIG. 3 can periodically request the then-current virus outbreak information from virus information processor 108. In an embodiment, messaging gateway 107 retrieves the virus outbreak information from the virus information processor 108 approximately every five (5) minutes, using a secure communication protocol that prevents unauthorized parties from accessing the virus outbreak information. If the messaging gateway 107 is unable to retrieve the virus outbreak information, the gateway can use the last available virus outbreak information stored in the gateway.

In block 304, an anti-spam process is applied to the message and messages that appear to be unsolicited messages are marked or processed according to a spam policy. For example, spam messages may be silently dropped, moved to a specified mailbox or folder, or the subject of the message may be modified to include a designation such as "possible spam." The performance of block 304 is optional. Thus, some embodiments may perform block 304, while other embodiments may not perform block 304.

In block 306, an anti-virus process is applied to the message and messages that appear to contain viruses, in the message or in a file attachment, are marked. In one embodiment, anti-virus software from Sophos implements block 306. If a message is determined as positive for a virus, then in block 308, the message is deleted, quarantined in quarantine queue 316, or otherwise processed according to an appropriate virus processing policy.

Alternatively, if block 306 determines that the message is not virus positive, then in block 310, a test is performed to determine whether the message has been scanned for viruses before. As explained further herein, block 306 can be reached again from later blocks after the message has been previously scanned for viruses.

If in block 306 the message has been scanned for viruses before, then the process of FIG. 3 assumes that the anti-virus process 306 has been updated with all patterns, rules, or other information necessary to successfully identify viruses when a virus outbreak has been identified. Therefore, control passes to block 314 in which the message that was scanned before is delivered. If the message is determined in block 310 to not have been scanned before, the process continues to block 312.

In block 312, a test is performed to determine whether the virus outbreak information obtained at block 302 satisfies a specified threshold. For example, if the virus outbreak information includes a virus score value (VSV), the virus score value is checked to see if the virus score value is equal to or greater than a threshold virus score value.

The threshold is specified by an administrator command, in a configuration file, or is received from another machine, process or source in a separate process. In one implementation, the threshold corresponds to the probability that a message contains a virus or is associated with a new virus outbreak. A virus that receives a score above the threshold is subject to the actions specified by an operator, such as performing a quarantine of the message in quarantine queue 316. In some implementations, a single specified threshold is used for all messages, whereas in other implementations, multiple thresholds are used based on different characteristics, so that the administrator can treat some messages more cautiously than others based on the type of messages that the messaging gateway receives and what is considered to be normal or less risky for the associated message recipients. In one embodiment, a default threshold value of 3 is used, based on a virus score scale of 0 to 5, where 5 is the highest risk (threat) level.

For example, the virus outbreak information can include a virus score value, and a network administrator can determine an allowed threshold virus score value and broadcast the threshold virus score value to all message transfer agents or other processors that are performing the process of FIG. 3. As another example, the virus outbreak information can include a set of rules that associate virus score values with one or more message characteristics that are indicative of viruses, and based on the approach described herein with respect to FIG. 5, a virus score value can be determined based on the matching rules for the message.

The value of the threshold virus score value set by the administrator indicates when to initiate delayed delivery of messages. For example, if the threshold virus score value is 1, then a messaging gateway implementing FIG. 3 will delay delivery of messages when the virus score value determined by the virus information processor 108 is low. If the threshold virus score value is 4, then a messaging gateway implementing FIG. 3 will delay delivery of messages when the virus score value determined by the virus information processor 108 is high.

If the specified threshold score value is not exceeded, then in block 314, the message is delivered.

If the threshold virus score value is determined to be exceeded in block 312 and the message has not yet been scanned before as determined in block 310, then the message is placed in an outbreak quarantine queue 316. Each message is tagged with a specified holding time value, or expiration date-time value, representing a period of time during which the message is held in the outbreak quarantine queue 316. The purpose of the outbreak quarantine queue 316 is to delay delivery of messages for an amount of time that is sufficient to enable updating of anti-virus process 306 to account for a new virus that is associated with the detected virus outbreak.

The holding time may have any desired duration. Example holding time values could be between one (1) hour and twenty four (24) hours. In one embodiment, a default holding time value of twelve (12) hours is provided. An administrator may change the holding time at any time, for any preferred holding time value, by issuing a command to a messaging gateway that implements the processes herein. Thus, the holding time value is user-configurable.

One or more tools, features, or user interfaces may be provided to allow an operator to monitor the status of the outbreak quarantine queue and the quarantined messages. For example, the operator can obtain a list of messages currently quarantined, and the list can identify the reason why each message in the queue was quarantined, such as the applicable virus score value for the message that satisfied the specified threshold or the rule, or rules, in a set of rules that matched for the message. Summary information can be provided by message characteristic, such as the types of file attachments, or by the applicable rule if a set of rules are being used. A tool can be provided to allow the operator to review each individual message in the queue. Another feature can be provided to allow the operator to search for quarantined messages that satisfy one or more criteria. Yet another tool can be provided to simulate a message being processed, which can be referred to as "tracing" a message, to make sure that the configuration of the messaging gateway has been correctly performed and that the inbound messages are being properly processed according the virus outbreak filter.

In addition, a tool can be provided showing general alert information from virus information processor, a VOOC, or an RVS concerning special or significant virus risks or threats that have been identified. Also, tools can be included in the MGA to contact one or more personnel associated with the MGA when alerts are issued. For example, an automated telephone or paging system can contact specified individuals when messages are being quarantined, when a certain number of messages have been quarantined, or when the capacity of the quarantine queue has been filled or has reached a specified level.

A message may exit the outbreak quarantine queue 316 in three ways indicated by paths designated 316A, 316B, 316C in FIG. 3. As shown by path 316A, a message may expire normally when the specified holding time expires for that message. As a result, with normal expiration, in one implementation, the outbreak quarantine queue 316 operates as a FIFO (first in, first out) queue. The message is then transferred back to anti-virus process 306 for re-scanning, on the assumption that after expiration of the holding time, the anti-virus process has been updated with any pattern files or other information necessary to detect viruses that may be in the message.

As indicated by path 316B, a message may be manually released from outbreak quarantine queue 316. For example, in response to a command issued by an administrator, operator, or other machine or process, one or more messages can be released from outbreak quarantine queue 316. Upon a manual release, in block 318 an operator decision to re-scan or delete the message is performed, such as when the operator may have received off-line information indicating that a particular kind of message is definitely virus-infected; in that case, the operator could elect to delete the message at block 320. Alternatively, the operator may have received, before expiration of the holding time value, off-line information indicating that anti-virus process 306 has just been updated with new patterns or other information in response to a virus outbreak. In that case the operator may elect to re-scan the message by sending it back to the anti-virus process 306 for scanning, without waiting for the holding time to expire, as shown by path 319.

As yet another example, the operator can perform a search of the messages currently held in outbreak quarantine queue 316 to identify one or more messages. A message thus identified can be selected by the operator for scanning by anti-virus process 306, such as to test whether anti-virus process 306 has been updated with information sufficient to detect the virus that is involved in the virus outbreak. If the rescan of the selected message is successfully at identifying the virus, the operator can manually release some or all of the messages in outbreak quarantine queue so that the released messages can be rescanned by anti-virus process 306. However, if the virus is not detected by anti-virus process in the selected test message, then the operator can wait until a later time and retest a test message or another message to determine if anti-virus process 306 has been updated to be able to detect the virus, or the operator can wait and let the messages be released when the messages' expiration times expire.

As shown by path 316C, a message also may expire early, for example, because the outbreak quarantine queue 316 is full. An overflow policy 322 is applied to messages that expire early. For example, the overflow policy 322 may require that the message be deleted, as indicated in block 320. As another example, the overflow policy 322 may require that the subject of the message be appended with a suitable warning of the risk that the message is likely to contain a virus, as indicated by block 324. For example, a message such as "MAY BE INFECTED" or "SUSPECTED VIRUS" can be appended to the subject, such as at the end or beginning of the message's subject line. The message with the appended subject is delivered via anti-virus process 306, and because the message has been scanned before, the process continues from anti-virus process 306 through block 310, and the message is then delivered as indicated by block 314.

Additional overflow policies can be applied, although not illustrated in FIG. 3 for clarity. For example, the overflow policy 322 may require removal of file attachments to the message followed by delivery of the message with the file attachments stripped. Optionally, the overflow policy 322 may require stripping only those file attachments that exceed a particular size. As another example, the overflow policy 322 may require that when the outbreak quarantine queue 316 is full, the MTA is allowed to receive a new message, but before the message is accepted during the SMTP transaction, the message is rejected with a 4xx temporary error.

In one embodiment, treatment of a message according to path 316A, 316B, 316C is user configurable for the entire contents of the quarantine queue. Alternatively, such a policy is user configurable for each message.

In an embodiment, block 312 also may involve generating and sending an alert message to one or more administrators when the virus outbreak information obtained from virus information processor 108 satisfies a specified threshold, such as when a virus score value meets or exceeds a specified threshold virus score value. For example, an alert message sent at block 312 may comprise an email that specifies the attachment types for which the virus score has changed, current virus score, prior virus score, current threshold virus score, and when the last update of the virus score for that type of attachment was received from the virus information processor 108.

In yet another embodiment, the process of FIG. 3 may involve generating and sending an alert message to one or more administrators whenever the overall number of messages in the quarantine queue exceeds a threshold set by the administrator, or when a specific amount or percentage of quarantine queue storage capacity has been exceeded. Such an alert message may specify the quarantine queue size, percentage of capacity utilized, etc.

The outbreak quarantine queue 316 may have any desired size. In one embodiment, the quarantine queue can store approximately 3 GB of messages.

2.4 Generating Virus Outbreak Information

In one embodiment, virus outbreak information is generated that indicates the likelihood of a virus outbreak based on one or more message characteristics. In one embodiment, the virus outbreak information includes a numerical value, such as a virus score value. The virus outbreak information can be associated with one or more characteristics of a message, such as the type of attachment with a message, the size of the attachment, the contents of the message (e.g., the content of the subject line of the message or the body of the message), the sender of the message, the IP address or domain of the sender of the message, the recipient of the message, the SenderBase reputation score for the sender of the message, or any other suitable message characteristic. As a specific example, the virus outbreak information can associate one message characteristic with a virus score value, such as "EXE=4" to indicate a virus score value of "4" for messages with EXE type attachments.

In another embodiment, the virus outbreak information includes one or more rules that each associates the likelihood of a virus outbreak with one or more message characteristics. As a specific example, a rule of the form "if EXE and size <50 k, then 4" indicates that for messages with attachments of type EXE and size less than 50 k, the virus score value is "4." A set of rules can be provided to the messaging gateway to be applied to determine if an inbound message matches the message characteristics of a rule, thereby indicating that the rule is applicable to the inbound message and therefore should be handled based on the associated virus score value. The use of a set of rules is described further with respect to FIG. 5 below.

Figure 4:
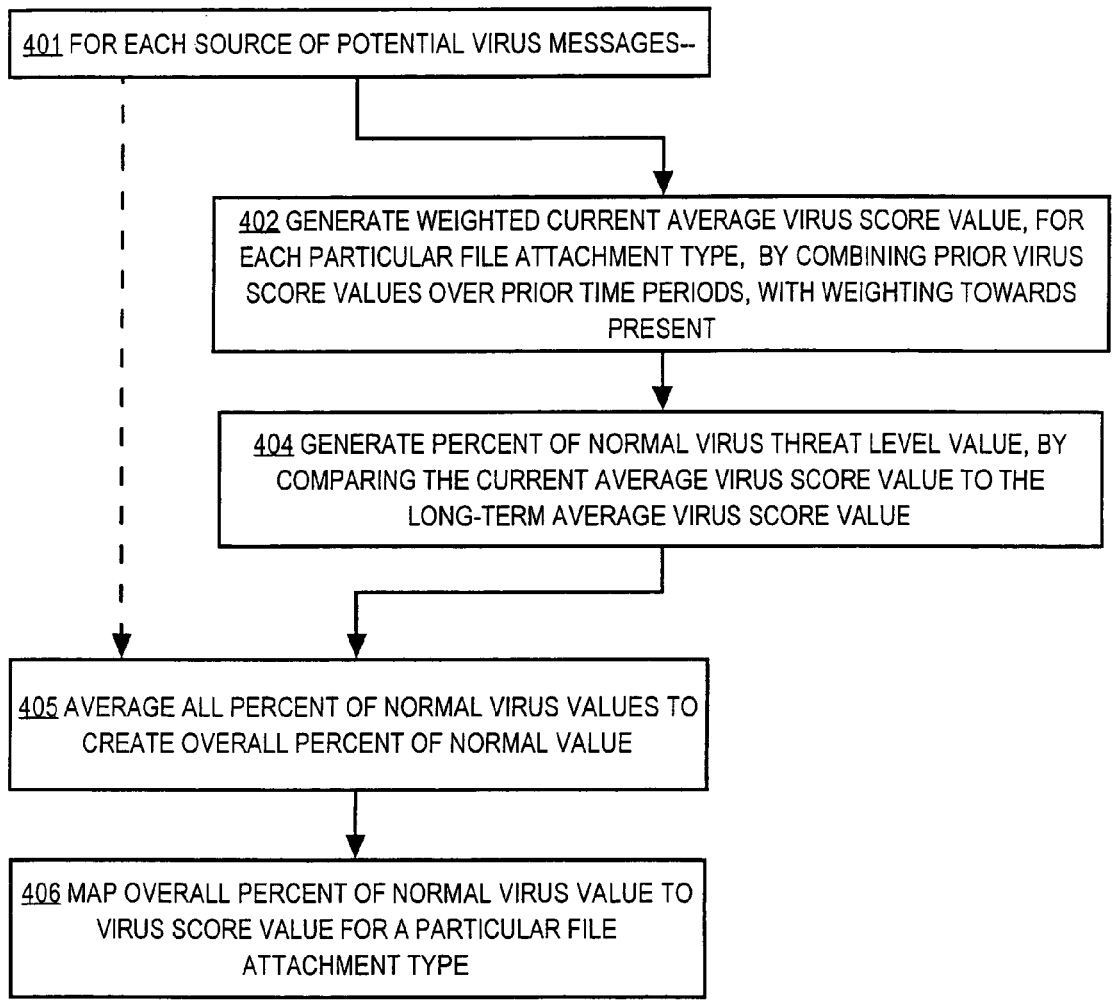
FIG. 4 is a flow diagram of a method of determining a virus score value, according to an embodiment.

FIG. 4 is a flow diagram of a method of determining a virus score value, according to an embodiment. In one implementation, the steps of FIG. 4 may be performed by virus information processor 108 based on information in database 112 received from virus information source 104 and spamtrap 106.

Step 401 of FIG. 4 indicates that certain computational steps 402, 404 are performed for each different source of virus information that is accessible to virus information processor 108, such as virus information source 104 or spamtrap 106.

Step 402 involves generating a weighted current average virus score value, for a particular email file attachment type, by combining one or more prior virus score values for prior time periods, using a weighting approach that accords greater weight for more recent prior virus score values. A virus score value for a particular time period refers to a score value based on the number of messages received at a particular source that have suspicious file attachments. A message is considered to have a suspicious attachment if the attachment satisfies one or more metrics, such as a particular file size, file type, etc., or if the network address of the sender is known to be associated with prior virus outbreaks. The determination may be based on attachment file size or file type or extension.

The determination of the virus score value also may be made by extracting a source network address from the message, such as a source IP address value, and issuing a query to the SenderBase service to determine whether the source is known to be associated with spam or viruses. The determination also may be based upon (a) the type or extension of a file attachment that is directly attached to the message, (b) the type or extension of a file that is contained within a compressed file, an archive, a .zip file, or another file that is directly attached to the message, and (c) a data fingerprint obtained from an attachment. A separate virus score value may be generated and stored for each attachment type found in any of the foregoing. Further, the virus score value may be generated and stored based upon the most risky attachment type found in a message.

In one embodiment, step 402 involves computing a combination of virus score values for the last three 15-minute periods, for a given file attachment type. Further, in one embodiment, a weighting value is applied to the three values for the 15-minute periods, with the most recent 15-minute time period being weighted more heavily than earlier 15-minute time periods. For example, in one weighting approach, a multiplier of 0.10 is applied to the virus score value for the oldest 15-minute period (30-45 minutes ago), a multiplier of 0.25 is applied to the second-oldest value (15-30 minutes ago), and a multiplier of 0.65 is applied to the most recent virus score value for the period 0-15 minutes ago.

In step 404, a percent-of-normal virus score value is generated for a particular file attachment type, by comparing the current average virus score value determined at step 402 to a long-term average virus score value. The current percent of normal level may be computed with reference to a 30-day average value for that file attachment type over all 15-minute time periods within the 30-day period.

In step 405, all of the percent-of-normal virus score values for all sources, such as virus information source 104 and spamtrap 106, are averaged to result in creating an overall percent-of-normal value for a particular file attachment type.

In step 406, the overall percent-of-normal value is mapped to a virus score value for a particular file attachment type. In one embodiment, the virus score value is an integer between 0-5, and the overall percent-of-normal value is mapped to a virus score value. Table 1 presents an example of a virus score scale.

TABLE 1

Example Virus Score Scale

| Percent of normal | Score | Level of Threat |
| --- | --- | --- |
| 0-150 | 0 | No known threat/very low threat |
| 150-300 | 1 | Possible threat |
| 300-900 | 2 | Small threat |
| 900-1500 | 3 | Moderate threat |
| >1500 | 4 | High threat/extremely risky |

In other embodiments, mappings to score values of 0 to 100, 0 to 10, 1 to 5, or any other desired range of values may be used. In addition to integer score values, non-integer values can be used. Instead of using a defined range of values, a probability value can be determined, such as a probability in the range of 0% to 100% in which the higher probabilities indicate a stronger likelihood of a virus outbreak, or such as a probability in the range of 0 to 1 in which the probability is expressed as a fraction or decimal, such at 0.543.

As an optimization, and to avoid division by zero issues that may occur with very low 30-day counts, the process of FIG. 4 can add one to the baseline averages computed in step 402. In essence, adding one raises the noise level of the values slightly in a beneficial way, by dampening some of the data.

Table 2 presents example data for the EXE file type in a hypothetical embodiment:

TABLE 2

Example data for ".exe" file type:

| Source | 30-day average | Current ".exe" counts, 45 min., 30 min., 15 min. ago | Current average | Current ".exe" as % of normal |
| --- | --- | --- | --- | --- |
| Source 1 | 3.6 | 21, 40, 3 | 14 | 382% |
| Source 2 | 15.4 | 50, 48, 7 | 21.6 | 140% |
| Source 3 | 1.7 | 1, 1, 15 | 10.1 | 600% |
| Source 4 | 1.3 | 15, 15, 15 | 15 | 1200% |
| Average % of normal | | | | 581% |
| Virus Score | | | | 2 |

In an alternative embodiment, the processes of FIG. 2, FIG. 3, FIG. 4 also may include logic to recognize trends in the reported data and identify anomalies in virus score computations.

Since the majority of executables are spread through one type of email attachment or another, the strategy of the approaches herein focuses on making policy decisions based on attachment type. In an alternative embodiment, a virus score value could be developed by considering other message data and metadata, such as Universal Resource Locators (URLs) in a message, the name of a file attachment, source network address, etc. Further, in an alternative embodiment, a virus score value may be assigned to individual messages rather than to file attachment types.

In yet another embodiment, other metrics may be considered to determine the virus score value. For example, if a large number of messages are suddenly received from new hosts that have never sent messages to virus information processor 108 or its information sources before, a virus may be indicated. Thus, the fact that the date that a particular message has been first seen is recent, and a spike in message volume detected by virus information processor 108, may provide an early indication of a virus outbreak.

2.5 Using Virus Outbreak Information

As described above, virus outbreak information can simply associate a virus score value with a message characteristic, such as an attachment type, or virus outbreak information can include a set of rules that each associates a virus score value with one or more characteristics of messages that are indicative of viruses. An MGA can apply the set of rules to incoming messages to determine which rules match a message. Based on the rules that match an incoming message, the MGA can determine the likelihood that the message includes a virus, such as by determining a virus score value based on one or more of the virus score values from the matching rules.

For example, a rule can be "if 'exe', then 4" to denote a virus score of 4 for messages with EXE attachments. As another example, a rule can be "if 'exe' and size <50k, then 3" to denote a virus score of 3 for messages with EXE attachments with a size of less than 50 k. As yet another example, a rule can be "if SBRS<–5, then 4" to denote a virus score of 4 if the SenderBase Reputation Score (SBRS) is less than "–5". As another example, a rule can be "if 'PIF' and subject contains FOOL, then 5" to denote a virus score of 5 if the message has a PIF type of attachment and the subject of the message includes the string "FOOL." In general, a rule can associate any number of message characteristics or other data that can be used to determine a virus outbreak with an indicator of the likelihood that a message matching the message characteristics or other data includes a virus.

Furthermore, a messaging gateway can apply exceptions, such as in the form of one or more quarantine policies, to determine whether a message, which otherwise satisfies the specified threshold based on the virus score value determined based on the matching rules, such as is determined in block 312 of FIG. 3, is to be placed into the outbreak quarantine queue or whether the message is to be processed without being placed into the outbreak quarantine queue. The MGA can be configured to apply one or more policies for applying the rules, such as a policy to always allow messages to be delivered to an email address or group of email addresses regardless of the virus scores, or to always deliver messages with a specified type of attachment, such as ZIP files containing PDF files.

In general, by having the virus information processor supply rules instead of virus score values, each MGA can apply some or all of the rules in a manner determined by the administrator of the MGA, thereby providing additional flexibility to meet the needs of the particular MGA. As a result, even if two messaging gateways 107 use the same set of rules, the ability to configure the application of the rules by the administrator of each MGA means that each MGA can process the same message and obtain a different result in terms of the determined likelihood that a virus attack is occurring, and each MGA can process the same message and take different actions, depending on the configuration established by the administrator for the MGA.

Figure 5:
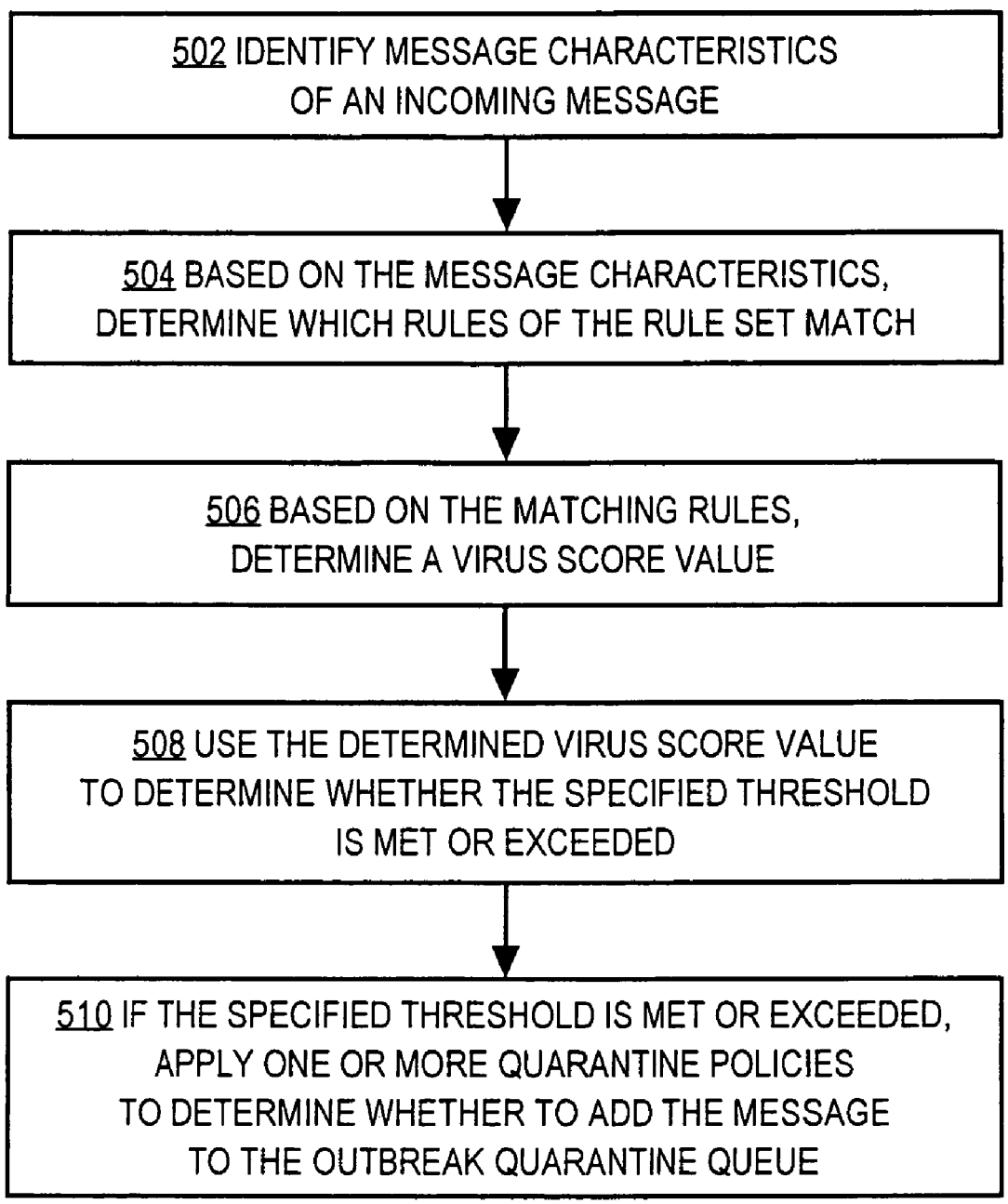
FIG. 5 is a flow diagram illustrating application of a set of rules for managing virus outbreaks according to an embodiment.

FIG. 5 is a flow diagram illustrating application of a set of rules for managing virus outbreaks, according to an embodiment. The functions illustrated in FIG. 5 can be performed by the messaging gateway as part of block 312 or at any other suitable position during the processing of the incoming message.

In block 502, the messaging gateway identifies the message characteristics of an incoming message. For example, messaging gateway 107 can determine whether the message has an attachment, and if so, the type of attachment, the size of the attachment, and the name of the attachment. As another example, messaging gateway 107 can query the SenderBase service based on the sending IP address to obtain a SenderBase reputation score. For the purposes of describing FIG. 5, assume that that message has an EXE type of attachment with a size of 35 k and that sending host for the message has a SenderBase reputation score of −2.

In block 504, the messaging gateway determines which rules of the rule set are matched based on the message characteristics for the message. For example, assume that for the purposes of describing FIG. 5, the rule set consists of the following five rules that associate the example characteristics with the provided hypothetical virus score values:

Rule 1: "if EXE, then 3"
Rule 2: "if ZIP, then 4"
Rule 3: "if EXE and size>50 k, then 5"
Rule 4: "if EXE and size<50 k and size>20 k, then 4"
Rule 5: "if SBRS<−5, then 4"

In these example rules, Rule 1 indicates that ZIP attachments are more likely to include a virus than EXE attachments because the virus score is 4 in Rule 2 but only 3 in Rule 1. Furthermore, the example rules above indicate that EXE attachments with a size of greater than 50 k are the most likely to have a virus, but EXE attachments with a size of less than 50 k but greater than 20 k are a little less likely to include a virus, perhaps because most of the suspicious messages with EXE attachments are greater than 50 k in size.

In the present example in which the message has an EXE type of attachment with a size of 35 k and the associated SenderBase reputation score is −2, Rules 1 and 4 match while Rules 2, 3, and 5 do not match.

In block 506, the messaging gateway determines a virus score value to be used for the message based on the virus score values from the matching rules. The determination of the virus score value to be used for the message can be performed based on any of a number of approaches. The particular approach used can be specified by the administrator of the messaging gateway and modified as desired.

For example, the rule that is matched first when applying the list of rules in the order listed can be used, and any other matching rules are ignored. Thus, in this example, the first rule to match is Rule 1, and therefore the virus score value for the message is 3.

As another example, the matching rule with the highest virus score value is used. Thus, in this example, Rule 3 has the highest virus score value among the matching rules, and therefore, the virus score value for the message is 5.

As yet another example, the matching rule with the most specific set of message characteristics is used. Thus, in this example, Rule 4 is the most specific matching rule because Rule 4 includes three different criteria, and therefore the virus score value for the message is 4.

As another example, virus score values from the matching rules can be combined to determine the virus score value to apply to the message. As a specific example, the virus score values from Rules 1, 3, and 4 can be averaged to determine a virus score value of 4 (e.g., $(3+4+5) \div 3 = 4$). As another example, a weighted average of the virus score values of the matching rules can be used, so as to give more weight to the more specific rules. As a specific example, the weight for each virus score value can be equal to the number of criteria in the rule (e.g., Rule 1 with one criterion has a weight of 1 while Rule 4 with three criteria has a weight of 3), and thus the weighted average of Rule 1, 3, and 4 results in a virus score value of 4.2 (e.g., $(1*3+2*5+3*4) \div (1+2+3) = 4.2$).

In block 508, the messaging gateway uses the virus score value determined in block 506 to determine whether the specified threshold virus score value is satisfied. For example, assume that in this example the threshold is a virus score value of 4. As a result, the virus score value determined in block 506 by all the example approaches would satisfy the threshold value, except for the first example that uses the first rule to match and for which block 506 determines the virus score value to be 3.

If the specified threshold is determined to be satisfied by the virus score value determined in block 508, then in block 510 one or more quarantine policies are applied to determine whether to add the message to the outbreak quarantine queue. For example, the administrator of the messaging gateway may determine that one or more users or one or more groups of users should never have their messages quarantined even if a virus outbreak has been detected. As another example, the administrator can establish a policy that messages with certain characteristics (e.g., messages with XLS attachments with a size of at least 75 k) are to always be delivered instead of being quarantined when the virus outbreak information indicates a virus attack based on the specified threshold.

As a specific example, the members of the organizations legal department may frequently receive ZIP files containing important legal documents that should not be delayed by being placed in the outbreak quarantine, even if the messaging gateway determines that a virus outbreak is occurring. Thus, the mail administrator for the messaging gateway can establish a policy to always deliver messages with ZIP attachments to the legal department, even if the virus score value for ZIP attachments meets or exceeds the specified threshold.

As another specific example, the mail administrator may wish to always have messages delivered that are addressed to the email address for the mail administrator, since such messages could provide information for dealing with the virus outbreak. Given that the mail administrator is a sophisticated user, the risk in delivering a virus infected message is low since the mail administrator will likely be able to identify and deal with an infected message before the virus can act.

For the example being used in describing FIG. 5, assume that the mail administrator has established a policy that EXE attachments addressed to the company's senior engineering managers are to always be delivered, even if the virus score value for such messages meets or exceeds a threshold virus score value. Thus, if the message is addressed to any of the senior engineering managers, the message is nevertheless delivered instead of being placed into the outbreak quarantine. However, messages addressed to others besides the senior engineering manages are quarantined (unless otherwise excluded by another applicable policy).

In one embodiment, the messaging gateway can be configured to be in one of two states: "calm" and "nervous." The calm state applies if no messages are being quarantined. However, when virus outbreak information is updated and indicates that a specified threshold is exceeded, the state changes from calm to nervous, regardless of whether any messages being received by the messaging gateway are being quarantined. The nervous state persists until the virus outbreak information is updated and indicates that the specified threshold is not longer exceeded.

In some implementations, an alert message is sent to an operator or administrator whenever a change in the system state occurs (e.g., calm to nervous or nervous to calm). In addition, alerts can be issued when a previously low virus score value that did not satisfy the threshold now does meet or exceed the threshold, even if the overall state of the system does not change (e.g., the system previously changed from calm to nervous, and while in the nervous state, another virus score was received from the virus information processor that also meets or exceeds the threshold). Similarly, an alert can be issued when a previously high virus score that did satisfy the threshold has dropped and now is less than the specified threshold.

Alert messages can include one or more types of information, including but not limited to, the following: the attachment type for which the virus outbreak information changed, the current virus score, the prior virus score, the current threshold, and when the last update for the virus outbreak information occurred.

2.6 Additional Features

One or more of the following additional features can be used in a particular implementation, in addition to the features described above.

One additional feature is to obtain sender-based data that is specifically designed to aid in the identification of virus threats. For example, when an MGA queries a service such as SenderBase to obtain the SenderBase reputation score for the connecting IP address, SenderBase can provide virus threat data that is specific for the connecting IP address. The virus threat data is based on data collected by SenderBase for the IP address and reflects the history of the IP address in terms of how often viruses are detected in messages originating from the IP address or the company associated with the IP address. This can allow the MGA to obtain a virus score from SenderBase based solely on the sender of the message without any information or knowledge about the content of a particular message from the sending IP address. The data on the virus threat for the sender can be used in place of, or in addition to, a virus score as determined above, or the data on the virus threat for the sender can be factored into the calculation of the virus score. For example, the MGA could increase or decrease a particular virus score value based on the virus threat data for the sender.

Another feature is to use a dynamic or dial-up blacklist to identify messages that are likely infected with a virus when a dynamic or dial-up host connects directly to an external SMTP server. Normally, dynamic and dial-up hosts that connect to the Internet are expected to send outgoing messages through the hosts' local SMTP server. However, if the host is infected with a virus, the virus can cause the host to connect directly to an external SMTP server, such as an MGA. In such a situation, the likelihood that the host is infected with a virus that is causing the host to establish the direct connection to the external SMTP server is high. Examples include spam and open relay blocking system (SORBS) dynamic hosts and not just another bogus list (NJABL) dynamic hosts.

However, in some cases, the direct connection is not virus initiated, such as when a novice user is making the direct connection or when the connection is from a broadband host that is not dynamic, such as DSL or cable modems. Nevertheless, such direct connections from a dial-up or dynamic host to an external SMTP server can result in determining a high virus score or increasing an already determined virus score to reflect the increased likelihood that the direct connection is due to a virus.

Another feature is to use as a virus information source an exploited host blacklist that track hosts that have been exploited by viruses in the past. A host can be exploited when the server is an open relay, an open proxy or has another vulnerability that allows anybody to deliver email to anywhere. Exploited host blacklists track exploited hosts using one of two techniques: the content that infected hosts are sending and locating hosts that have been infected via connect-time scanning. Examples include the Exploits Block List (XBL), which uses data from the Composite Blocking List (CBL) and the Open Proxy Monitor (OPM), and the Distributed Server Boycott List (DSBL).

Another feature is for the virus information processor to develop a blacklist of senders and networks that have a past history of sending viruses. For example, the highest virus score can be assigned to individual IP addresses that are known to send only viruses. Moderate virus scores can be associated with individual IP addresses that are known to send both viruses and legitimate messages that are not virus infected. Moderate to low virus scores can be assigned to networks that contain one or more individual infected hosts.

Another feature is to incorporate a broader set of tests for identifying suspicious messages in addition to those discussed above, such as identifying attachment characteristics. For example, a generic header test can be used to test on any generic message header to look for either a fixed string or a regular expression, such as in the following examples:

head X_MIME_FOO X-Mime=~/foo/ head SUBJECT_YOUR Subject=~/your document/

As another example, a generic body test can be used to test the message body by searching for a fixed string or a regular expression, such as in the following examples:

body HEY_PAL /hey pal|long time, no see/ body ZIP_PASSWORD /\.zip password is/i

As yet another example, a function test can be used to craft custom tests to test very specific aspects of a message, such as in the following examples:

eval EXTENSION_EXE message_attachment_ext(".exe")

eval MIME_BOUND_FOO mime_boundary("--/d/d/d/d[a-f]")

eval XBL_IP connecting_ip(exploited host)

As another example, a meta test can be used to build on multiple features, such as those above, to create a meta rule of rules, such as in the following examples:

meta VIRUS_FOO ((SUBJECT_FOO1||SUBJECT_FOO2) && BODY_FOO)

meta VIRUS_BAR (SIZE_BAR+SUBJECT_BAR+BODY_BAR>2)

Another feature that can be used is to extend the virus score determination approach above to one or more machine learning techniques so that not all rules need to be run and to provide accurate classification by minimizing false positives and false negatives. For example, one or more of the following methods can be employed: a decision tree, to provide discrete answers; perception, to provide additive scores; and Bayes-like analysis, to map probabilities to scores.

Another feature is to factor into the virus score determination the severity of the threat from a virus outbreak based on the consequences of the virus. For example, if the virus results in the infected computer's hard drive having all its contents deleted, the virus score can be increased, whereas a virus that merely displays a message can have the virus score left unchanged or even reduced.

Another additional feature is to expand the options for handling suspicious messages. For example, a suspicious message can be tagged to indicate that the message is suspicious, such as by adding to the message (e.g., in the subject or body) the virus score so that the user can be alerted to the level of virus risk determined for the message. As another example, a new message can be generated to either alert the recipient of the attempt to send to them a virus infected message or to create a new and uninfected message that includes the non-virus infected portions of the message.

2.7 Example Use Cases

The following hypothetical descriptions provide examples of how the approaches described herein may be used to manage virus outbreaks.

As a first use case, assume that a new virus entitled "Sprosts.ky" is spread through a Visual Basic macro embedded in Microsoft Excel. Shortly after the virus hits, the virus score moves from 1 to 3 for .xls attachments, and a user of the approaches herein, Big Company, starts delaying the delivery of Excel files. The network administrator for Big Company receives an email stating that .xls files are now quarantined. Sophos then sends out an alert an hour later stating that a new update file is available to stop the virus. The network administrator then confirms that his IronPort C60 has the latest update file installed. Although the network administrator had set the delay period to 5 hours for the quarantine queue, Excel files are critical to the company, so the administrator cannot afford to wait another four hours. Therefore, the administrator accesses the IronPort C60 and manually flushes the queue, sending all messages with Excel files attached through Sophos anti-virus checking. The administrator finds that 249 of these messages were virus positive, and 1 was not caught by Sophos, because it wasn't infected. The messages are delivered with a total delay of 1½ hours.

As a second use case, assume that a "Clegg.P" virus is spread through encrypted zip files. The network administrator at Big Company receives an email alert that the virus score value has jumped, but the administrator ignores the alert, relying on automatic processing as provided herein. Six hours later, overnight, the administrator receives a second page alerting him that the quarantine queue has reached 75% of capacity. By the time the administrator arrives at work, Clegg.P has filled Big Company's quarantine queue. Fortunately, the network administrator had set policies on the Iron-Port C60 to deliver messages as normal when the quarantine queue overflowed, and Sophos had come out with a new update overnight, before the quarantine queue overflowed. Only two users were infected prior to the virus score value triggering the quarantine queue, so the administrator is faced only with an over-filled quarantine queue. The administrator flushes the messages from the queue, automatically deleting them to spare load on the IronPort C60, on the assumption that all the messages were viruses. As a preventive approach, the network admin starts blocking all encrypted .zip files for a specified future time period.

3.0 Approaches for Blocking "Spam" Messages

Figure 7:
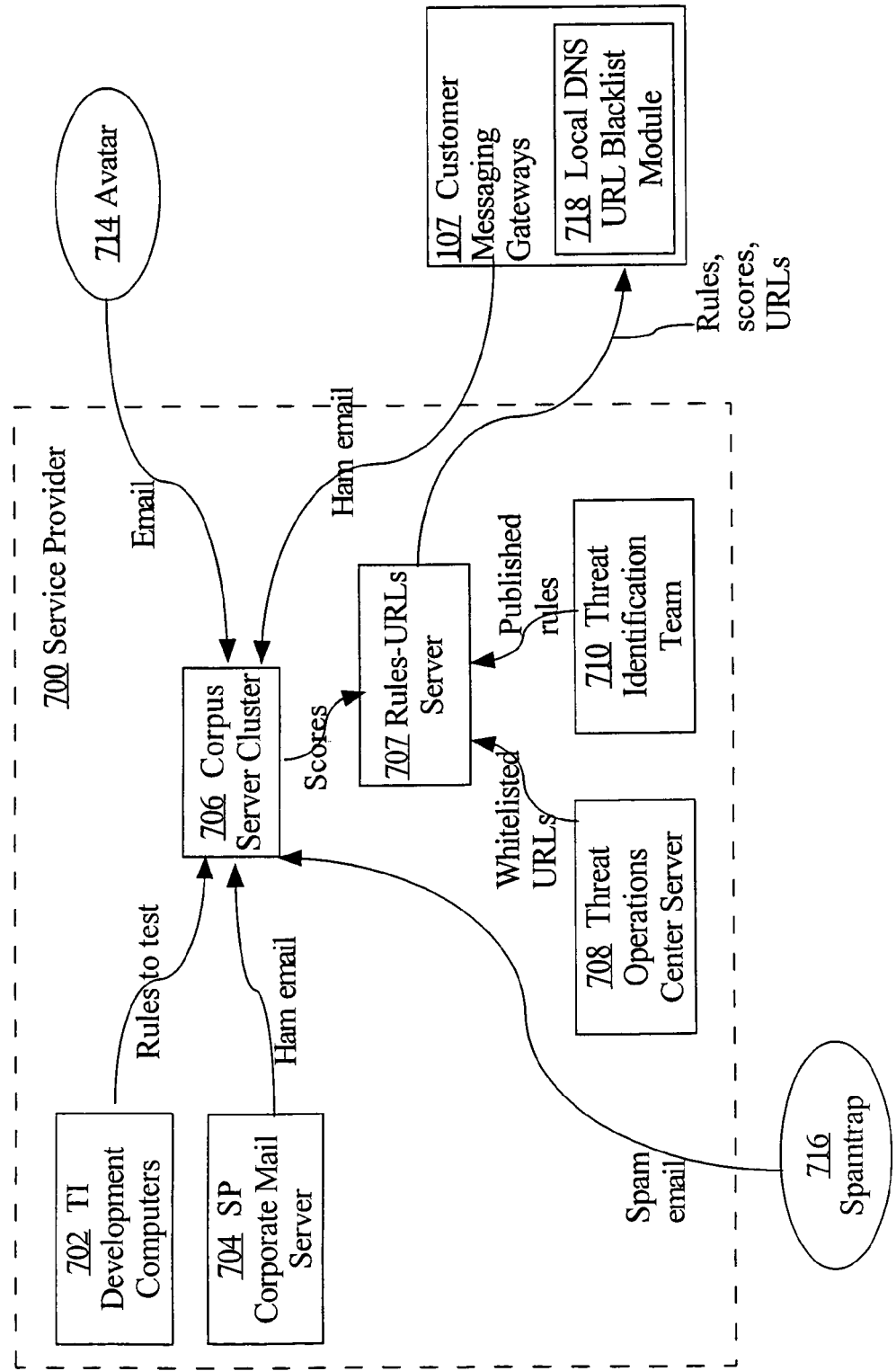
FIG. 7 is a block diagram of a system that may be used in approaches for blocking "spam" messages, and for other kinds of email scanning processes.

FIG. 7 is a block diagram of a system that may be used in approaches for blocking "spam" messages, and for other kinds of email scanning processes. In this context, the term "spam" refers to any unsolicited email, and the term "ham" refers to legitimate bulk email. The term "TI" refers to threat identification, that is, determining that virus outbreaks or spam communications are occurring.

Within a service provider 700, one or more TI development computers 702 are coupled to a corpus server cluster 706, which hosts a corpus or master repository for threat identification rules, and which applies threat identification rules to messages on an evaluation basis to result in generating score values. A mail server 704 of the service provider 700 contributes ham email to the corpus server cluster 706. One or more spamtraps 716 contribute spam email to the corpus. Spamtraps 716 are email addresses that are established and seeded to spammers so that the addresses receive only spam email. Messages received at spamtraps 716 may be transformed into message signatures or checksums that are stored in corpus server cluster 706. One or more avatars 714 contribute unclassified email to the corpus for evaluation.

Scores created by the corpus server cluster 706 are coupled to a rules/URLs server 707, which publishes the rules and URLs associated with viruses, spam, and other email threats to one or more messaging gateways 107 located at customers of the service provider 700. Messaging gateways 107 periodically retrieve new rules through HTTPS transfers. A threat operations center (TOC) 708 may generate and send the corpus server cluster 706 tentative rules for testing purposes. Threat operations center 708 refers to staff, tools, data and facilities involved in detecting and responding to virus threats. The TOC 708 also publishes rules that are approved for production use to the rules/URLs server 707, and sends the rules-URLs server whitelisted URLs that are known as not associated with spam, viruses or other threats. A TI team 710 may manually create other rules and provide them to the rules/URLs server.

For purposes of illustrating a clear example, FIG. 7 shows one messaging gateway 107. However, in various embodiments and commercial implementations, service provider 700 is coupled to a large number of field-deployed messaging gateways 107 at various customers or customer sites. Messaging gateways 107, avatar 714, and spamtrap 716 connect to service provider 700 through a public network such as the Internet.

According to one embodiment, each of the customer messaging gateways 107 maintains a local DNS URL blacklist module 718 comprising executable logic and a DNS blacklist. The structure of the DNS blacklist may comprise a plurality of DNS type A records that map network addresses, such as IP addresses, to reputation score values associated with the IP addresses. The IP addresses may represent IP addresses of senders of spam messages, or server addresses associated with a root domain of a URL that has been found in spam messages or that is known to be associated with threats such as phishing attacks or viruses.

Thus, each messaging gateway 107 maintains its own DNS blacklist of IP addresses. In contrast, in prior approaches, DNS information is maintained in a global location that must receive all queries through network communications. The present approach improves performance, because DNS queries generated by an MGA need not traverse a network to reach a centralized DNS server. This approach also is easier to update; a central server can send incremental updates to the messaging gateways 107 periodically. To filter spam messages, other logic in the messaging gateway 107 can extract one or more URLs from a message under test, provide input to the blacklist module 718 as a list of (URL, bitmask) pairs and receive output as a list of blacklist IP address hits. If hits are indicated, then the messaging gateway 107 can block delivery of the email, quarantine the email, or apply other policy, such as stripping the URLs from the message prior to delivery.

In one embodiment, the blacklist module 718 also tests for URL poisoning in an email. URL poisoning refers to a technique used by spammers of placing malicious or disruptive URLs within an unsolicited email message that also contains non-malicious URLs, so that an unsuspecting user who clicks on the URLs may unwittingly trigger malicious local action, displays of advertisements, etc. The presence of the "good" URLs is intended to prevent spam detection software from marking the message as spam. In an embodiment, the blacklist module 718 can determine when a particular combination of malicious and good URLs provided as input represents a spam message.

An embodiment provides a system for taking DNS data and moving it into a hash-type local database that can accept several database queries and then receive a DNS response.

The foregoing approaches may be implemented in computer programs that are structured as plug-ins to the SpamAssassin open source project. SpamAssassin consists of a set of Perl modules that can be used with a core program that provides a network protocol for performing message checks, such as "spamd," which is shipped with SpamAssassin. SpamAssassin's plug-in architecture is extensible through application programming interfaces; a programmer can add new checking heuristics and other functions without changing the core code. The plug-ins are identified in a configuration file, and are loaded at runtime and become a functional part of SpamAssassin. The APIs define the format of heuristics (rules to detect words or phrases that are commonly used in spam) and message checking rules. In an embodiment, the heuristics are based on dictionaries of words, and messaging gateway 107 supports a user interface that enables an administrator to edit the contents of the dictionaries to add or remove objectionable words or known good words. In an embodiment, an administrator can configure anti-spam logic 119 to scan a message against enterprise-specific content dictionaries before performing other anti-spam scanning. This approach enables messages to first receive a low score if they contain enterprise-specific terms or industry-standard terms, without undergoing other computationally expensive spam scanning.

Further, in a broad sense, the foregoing approaches enable a spam checking engine to receive and use information that has formed a basis for reputation determinations, but has not found direct use in spam checking. The information can be used to modify weight values and other heuristics of a spam checker. Therefore, a spam checker can determine with greater precision whether a newly received message is spam. Further, the spam checker becomes informed by a large volume of information in the corpus, also improving accuracy.

3.1 Early Exit from Spam Scanning

Anti-spam logic 119 normally operates on each message in a complete fashion, meaning that every element of each message is completely parsed, and then every registered test is performed. This gives a very accurate total assessment of whether a piece of mail is ham or spam. However, once a message is "spammy" enough, it can be flagged and treated as spam. There is no additional information necessary to contribute to the binary disposition of the mail. When an embodiment implements thresholds of spam and ham, then performance of anti-spam logic 119 increases by exiting from a message scan function once the logic determines that a message is "spammy" enough to be sure it is spam. In this description, such an approach is termed Early Exit from anti-spam parsing or scanning.

With Early Exit, significant time can be saved by not evaluating hundreds of rules that will merely further confirm that a message is spam. Since few negative scoring rules typically exist, once a certain threshold is hit, logic 119 can determine positively that a message spam. Two further performance gains are also implemented using mechanisms termed Rule Ordering and Execution, and Parse on Demand.

Rule Ordering and Execution is a mechanism using indicators allow certainty to be reached quickly. Rules are ordered and placed into test groups. After each group is executed the current score is checked, and a decision is made whether a message is "spammy" enough. If so, then logic 119 discontinues rule processing and announces the verdict that a message is spam.

Parse on Demand performs message parsing as part of anti-spam logic 119 only when required. For example, if parsing only message headers results in a determination that a message is spam, then no other parsing operations are performed. In particular, rules applicable to message headers can be very good indicators of spam; if anti-spam logic 119 determines that a message is spam based on header rules, then the body is not parsed. As a result, performance of anti-spam logic 119 increases, because parsing headers is computationally expensive than parsing the message body.

As another example, the message body is parsed but HTML elements are excluded if rules applied to non-HTML body elements result in a verdict of spam. Parsing the HTML or testing for URI blacklisting (as described further below) is performed only when required.

Figure 11:
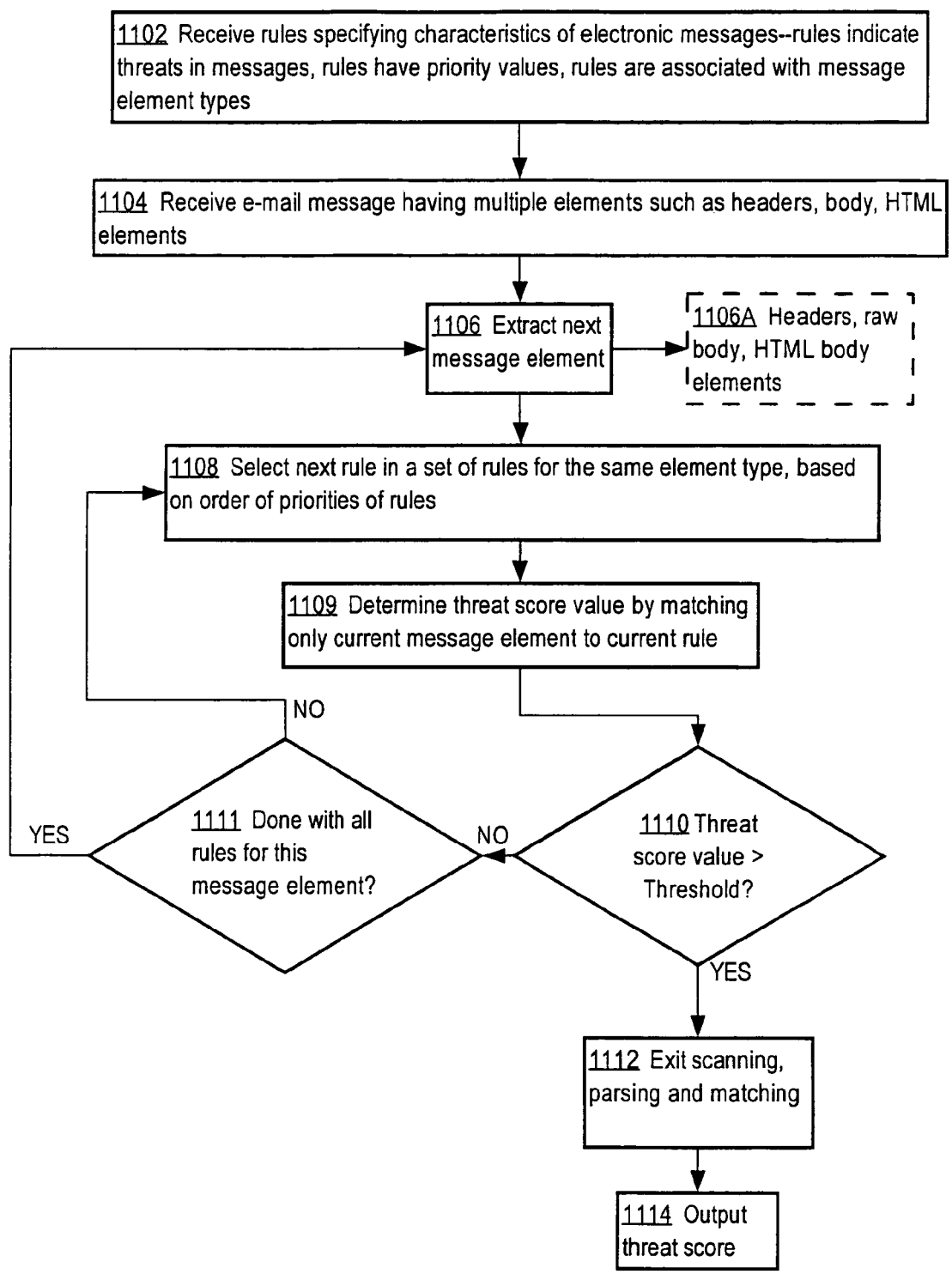
FIG. 11 is a flow diagram of a process of performing message threat scanning with an early exit approach.

FIG. 11 is a flow diagram of a process of performing message threat scanning with an early exit approach. In step 1102, a plurality of rules is received. The rules specify characteristics of electronic messages that indicate threats associated with the messages. Thus, when a rule matches a message element, the message probably has a threat or is spam. Each rule has a priority value, and each rule is associated with a message element type.

In step 1104, an electronic mail message is received, having a destination address for a recipient account. The message comprises a plurality of message elements. The elements typically include headers, a raw body, and HTML body elements.

In step 1106, a next message element is extracted. As indicated in block 1106A, step 1106 can involve extracting the headers, raw body, or HTML body elements. As an example, assume that only the message headers are extracted at step 1106. Extracting typically involves making a transient copy into a data structure.

In step 1108, a next rule is selected among a set of rules for the same element type, based on the order of the priorities of the rules. Thus, step 1108 reflects that for the current message element extracted at step 1106, only rules for that element type are considered, and the rules are matched according to the order of their priorities. For example, if the message headers were extracted at step 1106, then only header rules are matched. Unlike past approaches, the entire message is not considered at the same time and all the rules are not considered at the same time.

In step 1109, a threat score value for the message is determined by matching only the current message element to only the current rule. Alternatively, steps 1108 and 1109 can involve selecting all rules that correspond to the current message element type and matching all such rules to the current message element. Thus, FIG. 11 encompasses performing an early exit by testing after each rule, or matching all rules for a particular message element type and then determining if early exit is possible.

When the threat score value is greater than a specified threshold, as tested in step 1110, an exit from scanning, parsing and matching is performed at step 1112, and the threat score value is output at step 1114. As a result, early exit from the scanning process is accomplished and the threat score value may be output far more rapidly when the threshold is exceeded early in the scanning, extracting and rule matching process. In particular, the computationally costly process of rendering HTML message elements and matching rules to them can be skipped if header rules result in a threat score value that exceeds the threshold.

However, if the threat score value is not greater than the threshold at step 1110, then a test is performed at step 1111 to determine if all rules for the current message element have been matched. In the alternative noted above in which all rules for a message element are matched before the test of step 1110, step 1111 is not necessary. If other rules exist for the same message element type, then control returns to step 1108 to match those rules. If all rules for the same message element type have been matched, then control returns to step 1106 to consider the next message element.

The process of FIG. 11 may be implemented in an anti-spam scanning engine, an anti-virus scanner, or a generic threat-scanning engine that can identify multiple different kinds of threats. The threats can comprise any one of a virus, spam, or a phishing attack.

Accordingly, in an embodiment, a logical engine that performs anti-spam, anti-virus, or other message scanning operations does not perform tests or operations on a message once certainty about the message disposition has been reached. The engine groups rules into priority sets, so that the most effective and least costly tests are performed early. The engine is logically ordered to avoid parsing until a specific rule or group of rules requires parsing.

In an embodiment, rule priority values are assigned to rules and allow rules to be ordered in execution. For example, a rule with a priority of −4 runs before a rule with priority 0, and a rule with priority 0 runs before a rule with priority 1000. In an embodiment, rule priority values are assigned by an administrator when rule sets are created. Example rule priorities include −4, −3, −2, −1, BOTH, VOF and are assigned based on the efficacy of the rule, the rule type, and the profiled overhead of the rule. For example, a header rule that is very effective and is a simple regular expression comparison may be a −4 (run first) priority. BOTH indicates that a rule is effective for detecting both spam and viruses. VOF indicates a rule that is performed to detect a virus outbreak.

In an embodiment, threat identification team 710 (FIG. 7) determines rule grouping and ordering and assigns priorities. TI team 710 also can continuously evaluate the statistical effectiveness of the rules to determine how to order them for execution, including assigning different priorities.

In an embodiment, first the message headers are parsed and header rules run. Next, message body decoding is performed and raw body rules are run. Last, HTML elements are rendered, and body rules and URI rules are run. After each parsing step, a test is performed to determine if the current spam score is greater than a spam positive threshold. If so, then the parser exits and subsequent steps are not performed. Additionally or alternatively, the test is performed after each rule is run.

Table 3 is a matrix stating an example operational order of events within anti-spam logic 119 in an implementation of Early Exit. The HEAD row indicates the message HEAD is parsed, and header tests are run, and such tests support early exit, and are allowed to have the full priority range (−4 ... VOF).

TABLE 3

EXAMPLE OPERATIONAL ORDER FOR EARLY EXIT

| Parsing | Tests (in order) | EE | Priorities Allowed |
|---|---|---|---|
| HEAD | header | early exit | −4, −3, −2, −1, BOTH |
| | header_eval | early exit | |
| Decode | rawbody | early exit | −3, −2, −1, BOTH |
| | rawbody_eval | early exit | |
| Render | body | early exit | −2, −1, BOTH |
| | body_uri | early exit | |
| | body_eval | early exit | |
| | meta | early exit | BOTH |
| VOF | VOF | No | VOF (will run BOTH rules) |

3.2 Spam Scan Verdict Caching

Certain spam messages may case anti-spam logic 119 to require an extensive amount of time to determine a verdict about whether the message is spam. Thus, spam senders may use "poison message" attacks that repeatedly send such a difficult message in an attempt to force the system administrator to disable anti-spam logic 119. To address this issue and improve performance, in an embodiment, message anti-spam verdicts that anti-spam logic 119 generates are stored in a verdict cache 115 in messaging gateway 107, and anti-spam logic 119 reuses cached verdicts for processing messages that have identical bodies.

In an effective implementation, when the verdict retrieved from the cache is the same as the verdict that would be returned by an actual scan, the verdict is termed a "true verdict". A verdict from the cache that does not match the verdict from a scan is referred to as a "false verdict". In an effective implementation, some performance gains are traded off to assure reliability. For example, in an embodiment, the digest of the message "Subject" line is included as part of the key to the cache, which reduces the cache hit rate, but also reduces the chance of a false verdict.

A spam sender may attempt to defeat the use of a verdict cache by including a non-printing, invalid URL tag that varies in form in the body successive messages that are otherwise identical in content. The use of such tags within the message body will cause a message digest of the body to be different among such successive messages. In an embodiment, a fuzzy digest generating algorithm can be used in which HTML elements are parsed and non-displayed bytes are eliminated from the input to the digest algorithm.

In an embodiment, verdict cache 115 is implemented as a Python dictionary of verdicts from anti-spam logic 119. The key to the cache is a message digest. In an embodiment, anti-spam logic 119 comprises Brightmail software and the cache key comprises a DCC "fuz2" message digest. Fuz2 is an MD5 hash or digest of those portions of a message body that are meaningfully unique. Fuz2 parses HTML and skips over bytes in the message that do not affect what the user sees when viewing the message. Fuz2 also attempts to skip portions of the message that are frequently changed by spam senders. For example a Subject line that begins with "Dear" is excluded from the input to the digest.

In an embodiment, when anti-spam logic 119 begins processing a message that is eligible for spam or virus scanning, a message digest is created and stored. If creating a message digest fails or if use of verdict cache 115 is disabled, the digest is set to "None." The digest is used as a key to perform a lookup in verdict cache 115, to determine whether a previously computed verdict has been stored for a message with an identical message body. The term "identical" means identical in the parts of the message that the reader sees as meaningful in deciding whether or not the message is spam. If a hit occurs in the cache, then the cached verdict is retrieved and further message scanning is not performed. If no digest is present in the cache, then the message is scanned using anti-spam logic 119.

In an embodiment, verdict cache 115 has a size limit. If the size limit is reached, the least recently used entry is deleted from the cache. In an embodiment, each cache entry expires at the end of a configurable entry lifetime. The default value for the lifetime is 600 seconds. The size limit is set to 100 times the entry lifetime. Therefore, the cache requires a relatively small amount of memory of about 6 MB. In an embodiment, each value in the cache is a tuple comprising the time entered, a verdict, and the time that anti-spam logic 119 took to complete the original scan.

In an embodiment, if the requested cache key is present in the cache, then the time entered of the value is compared to current time. If the entry is still current, then the value of the item in the cache is returned as the verdict. If the entry has expired, it is deleted from the cache.

In an embodiment, several attempts may be made to compute a message digest before a verdict is cached. For example, fuz2 is used if available, otherwise fuz1 is used if available, and otherwise "all mime parts" is used as a digest if available, otherwise no cache entry is created. An "all mime part" digest comprises, in one embodiment, a concatenation of digests of the message's MIME parts. If there are no MIME parts, a digest of the entire message body is used. In an embodiment, the "all mime parts" digest is computed only if anti-spam logic 119 performs a message body scan for some other reason. Body scanning extracts the MIME parts, and the marginal cost of computing the digest is negligible; therefore, the operations can be combined efficiently.

In an embodiment, the verdict cache is flushed whenever messaging gateway 107 receives a rule update from rules-URLs server 707 (FIG. 7). In an embodiment, the verdict cache is flushed whenever a change in the configuration of anti-spam logic 119 occurs, for example, by administrative action or by loading a new configuration file.

In an embodiment, anti-spam logic 119 can scan multiple messages in parallel. Therefore, two or more identical messages could be scanned at the same time, causing a cache miss because the verdict cache is not yet updated based on one of the messages. In an embodiment, the verdict is cached only after one copy of the message is fully scanned. Other copies of the same message that are currently being scanned are cache misses.

In an embodiment, anti-spam logic 119 periodically scans the entire verdict cache and deletes expired verdict cache entries. In that event, anti-spam logic 119 writes a log entry in log file 113 that reports counts of cache hits, misses, expires and adds. Anti-spam logic 119 or verdict cache 115 may maintain counter variables for the purpose of performing logging or performance reporting.

In other embodiments, cached digests may be used for message filters or anti-virus verdicts. In an embodiment, multiple checksums are used to create a richer key that provides both a higher hit rate and a lower rate of false verdicts. Further, other information may be stored in the verdict cache such as the amount of time required to scan a long message for spam.

Optimizations can be introduced to address particular requirements of specific anti-spam software or logic. For example, Brightmail creates a tracker string and returns the tracker string with a message verdict; the tracker string can be added to the message as an X-Brightmail-Tracker header. The tracker string can be used by Brightmail's plug-in to Microsoft Outlook to implement language identification. The tracker string is also sent back to Brightmail when the plug-in reports a false positive.

Both the verdict and the tracker string can be different for messages that have identical bodies. In some cases the body is non-spam, but spam is encoded in the subject. In one approach, the message Subject line is included with the message body as input to the message digest algorithm. However, the Subject line can be different when the body of the message is clearly spam or clearly a virus of both. For example, two messages can contain the same virus and be considered spam by Brightmail, but the Subject header may be different. Each message may have a brief text attachment that is different from the other message, and may have different names. The name of the files in the attachments may be different. However, when both messages are scanned, the same verdict will result.

In an embodiment, cache hit rate is improved using a virus-positive rule. If the digest of an attachment matches a virus positive verdict and spam positive verdict, then the previous spam verdict is reused, even if the Subject and prologue are different.

In some similar messages a different From value and a different Message-ID line result in generating different tracker strings. The spam verdict is the same, but an obviously false "From" value and an obviously false Message-ID will result in finding the verdict sooner and reporting other rules in the tracker string. In an embodiment, the From header and the Message-ID header are deleted from the second message and the message is re-scanned, and the tracker header becomes is the same as for the first message.

4.0 Methods of Detection of Viruses Based on Message Heuristics, Sender Information, Dynamic Quarantine Operation, and Fine-Grained Rules 4.1 Detecting Using Message Heuristics According to one approach, detecting viruses using heuristic approaches is provided. Basic approaches for detecting virus outbreaks are described in copending application Ser. No. 11/006,209, filed Dec. 6, 2004, "Method and apparatus for managing computer virus outbreaks," of Michael Olivier et al.

In this context, message heuristics refers to a set of factors that are used to determine the likelihood that a message is a virus, when no signature information about the message is available. Heuristics may comprise rules to detect words or phrases that are commonly used in spam. Heuristics may vary according to a language used in the message text. In an embodiment, administrative users can select which language heuristics to use in anti-spam scanning. Message heuristics may be used to determine a VSV value. Heuristics of a message may be determined by a scanning engine that performs basic anti-spam scanning and anti-virus scanning.

A message can be placed in quarantine storage, because it may contain a virus, based on the results of heuristic operations rather than or in addition to definitions of virus outbreaks. Such definitions are described in the application of Olivier et al. referenced above. Thus, the corpus server cluster 706 contains a past history of viruses, and if a message matches a pattern in that past history as a result of the heuristics, then the message may be quarantined regardless of whether it matches the definitions of a virus outbreak. Such early quarantining provides a beneficial delay in message processing while the TOC prepares a definition of a virus outbreak.

Figure 8:
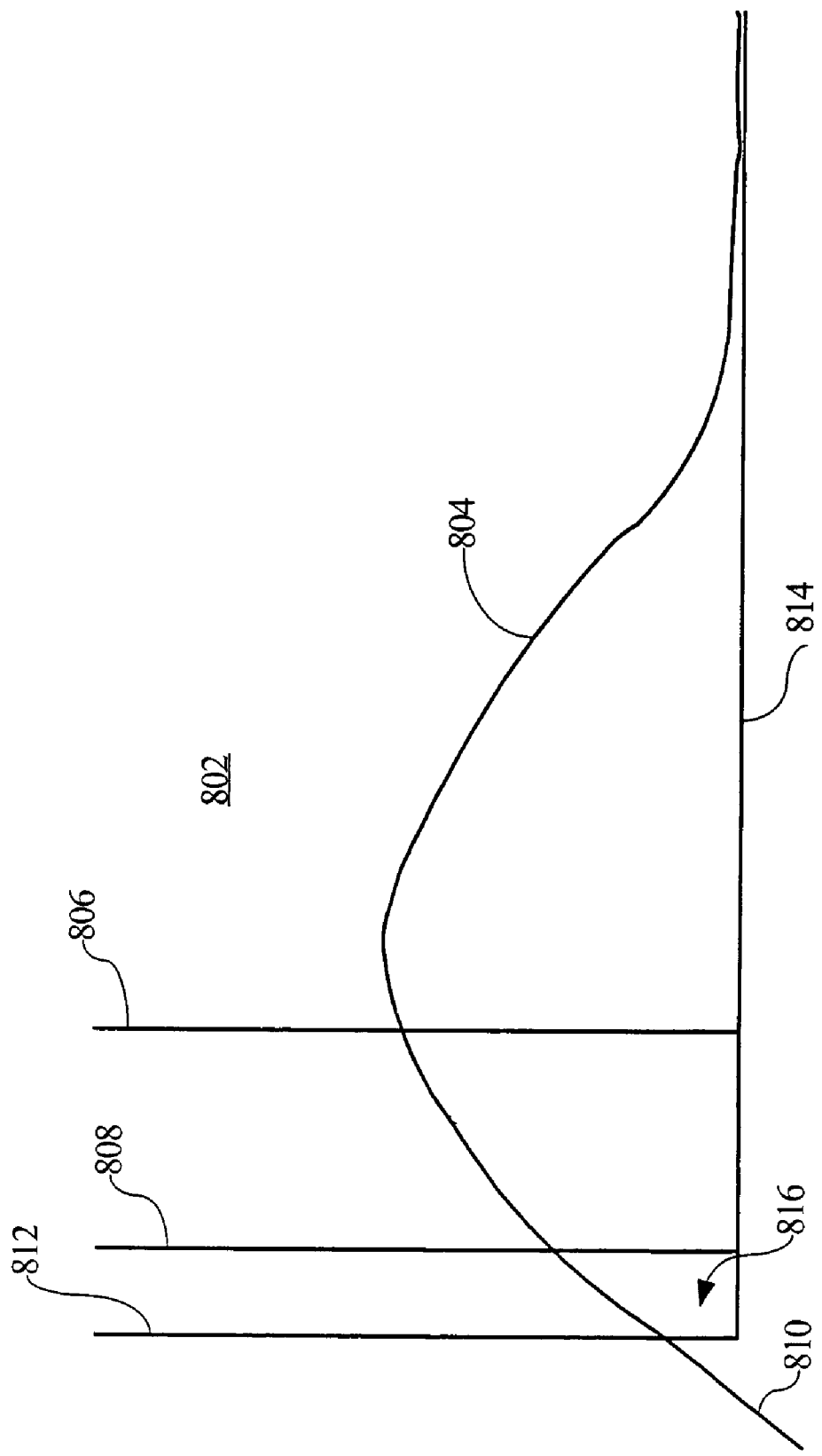
FIG. 8 is a graph of time versus the number of machines infected in a hypothetical example virus outbreak.

FIG. 8 is a graph of time versus the number of machines infected in a hypothetical example virus outbreak. In FIG. 8, the horizontal axis 814 represents time and vertical axis 812 represents a number of infected machines. Point 806 represents a time at which an anti-virus software vendor, such as Sophos, publishes an updated virus definition that will detect a virus-laden message and prevent further infection on machines in networks protected by messaging gateways 107 that are using that anti-virus software. Point 808 represents a time when the TOC 708 publishes a rule identifying a virus outbreak for the same virus. Curve 804 varies as indicated in FIG. 8 such that the number of infected machines increases over time, but the rate of increase goes down after point 808, and then the total number of infected machines eventually declines significantly further after point 806. Early quarantine based on heuristics as described herein are applied at point 810 to help reduce the number of machines that are covered within the area 816 of curve 804.

Variable quarantine time is used in one embodiment. The quarantine time may be increased when the heuristics indicate a higher likelihood that a message contains a virus. This provides maximum time for a TOC or anti-virus vendor to prepare rules or definitions, while applying minimum quarantine delay to messages that are less likely to contain a virus. Thus, the quarantine time is coupled to the probability that a message contains a virus, resulting in optimum use of quarantine buffer space, as well as minimizing the time of quarantining a message that is not viral.

4.2 Sender-Based Detection of Viruses

According to one approach, a virus score is determined and stored in a database in association with an IP address value of a sender of the message. The score thus indicates the likelihood that a message originating from the associated address will contain a virus. The premise is that machines that send one virus are likely to become infected with another virus or to become re-infected with the same virus or an updated virus, because those machines are not well protected. Further, if a machine is sending spam then it is more likely to be sending a virus.

The IP address may specify a remote machine, or may specify a machine that is within a corporate network that a messaging gateway 107 is protecting. For example, the IP address may specify a machine within the corporate network that inadvertently became infected with a virus. Such an infected machine is likely to send other messages that contain the virus.

In a related approach, a virus outbreak detection check can be performed at the same time in overall message processing as a spam check within the messaging gateway 107. Thus, virus outbreak detection can be performed at the same time that a message is parsed and subjected to spam detection. In one embodiment, one thread performs the foregoing operations in an ordered serial manner. Further, the results of certain heuristic operations can be used to inform both an anti-spam detection operation and an anti-virus detection operation.

In an embodiment, the VSV value is determined based upon any one or more of: filename extension; volume spikes in message volume on a local basis, on a global basis, identified per sender and per content; based on attachment content, such as Microsoft executables; and sender-based threat identification information. In various embodiments, a variety of sender-based threat identification information is used. Examples include dynamic or dial-up host blacklists, exploited host blacklists, and virus hot zones.

Dynamic and dial-up hosts connecting to the Internet generally send outgoing mail through a local SMTP server. When a host connects directly to an external SMTP server, such as messaging gateway 107, the host probably has been compromised and is sending either spam messages or an email virus. In an embodiment, messaging gateway 107 comprises logic that maintains a blacklist of dynamic hosts that have operated in the preceding manner in the past, or connects to a dynamic host blacklist may be obtained at an external source such as the NJABL dynamic hosts list and SORBS dynamic hosts list.

In this embodiment, identifying message characteristics of an incoming message at step 502 of FIG. 5 further comprises determining if a sender of the message is in the dynamic host blacklist. If so, then a higher VSV value is determined or assigned.

Step 502 also may comprise connecting to or managing an exploited host blacklist and determining if the sender of the message is on the exploited host blacklist. An exploited host blacklist tracks hosts that are known to be infected by viruses or that are known to send spam based on the content that infected hosts are sending and locating hosts that have been infected by connect time scanning. Examples include XBL (CBL and OPM) and DSBL.

In another embodiment, service provider 700 creates and stores an internal blacklist of senders and networks that have a past history of sending viruses, based on sender information received from customer messaging gateways 107. In an embodiment, customer messaging gateways 107 periodically initiate network communications to corpus server cluster 706 and report the network addresses (e.g., IP addresses) of senders of messages that internal logic of the messaging gateways 107 determined to be spam or associated with viruses or other threats. Logic at service provider 700 can periodically scan the internal blacklist and determine if any network addresses are known to send only viruses or spam. If so, the logic can store high threat level values or VSVs in association with those addresses. Moderate threat level values can be stored in association with network addresses that are known to send both viruses and legitimate email. Moderate or low threat level values can be associated with networks that contain one or more individual infected hosts.

Testing against the blacklists can be initiated using rules of the type described above. For example, the following rules can initiate blacklist testing:

eval DYNAMIC_IP connecting_ip(dynamic)
    eval HOTZONE_NETWORK connecting_ip(hotzone)
    eval XBL_IP connecting_ip(exploited host)

4.3 Dynamic Quarantine Operations Including Rescanning

In prior approaches, messages are released from quarantine in first-in-first-out order. Alternatively, a first-to-exit algorithm may be used, in another embodiment. In this approach, when the quarantine buffer is full, an ordering mechanism determines which messages should be released first. In one embodiment, messages that are deemed least dangerous are released first. For example, messages that have been quarantined as a result of heuristics are released first, and messages that have been quarantined as a result of matching virus outbreak tests are released second. To support this mechanism, each quarantined message is stored in the quarantine of a messaging gateway 107 in association with information indicating a reason for the quarantine. Thereafter, a process in the messaging gateway 107 can release messages based on the reasons.

The ordering may be configured in a data-driven fashion by specifying the order in a configuration file that is processed by the messaging gateway 107. Thus, publishing a new configuration file containing the ordering from the service provider to customer messaging gateways 107 automatically causes those messaging gateways 107 to adopt the new ordering.

Similarly, different actions can be taken on quarantined messages when those messages leave the quarantine based on the threat level associated with the messages when they leave the quarantine. For example, messages that appear extremely threatening but may leave the quarantine as a result of overflow can be subjected to a strip-and-deliver operation in which attachments are stripped and the message is delivered to the recipient without the attachments. Alternatively, a message with a lower threat level is delivered as normal.

In still another alternative, an X-header could be added to lower threat level messages. This alternative is appropriate when a client email program (e.g., Eudora, Microsoft Outlook) is configured with a rule to recognize the X-header and place messages with the X-header in a special folder (e.g., "Potentially Dangerous Messages"). In yet another alternative, a file attachment of a message with a particular threat level is renamed (the message is "de-fanged"), requiring the receiving user to affirmatively rename the file attachment again to make it usable with an application. This approach is intended to cause the user to examine the file carefully before renaming and opening it. The message could be forwarded to an administrator for evaluation. Any of these alternatives can be combined in an embodiment.

Figure 9:
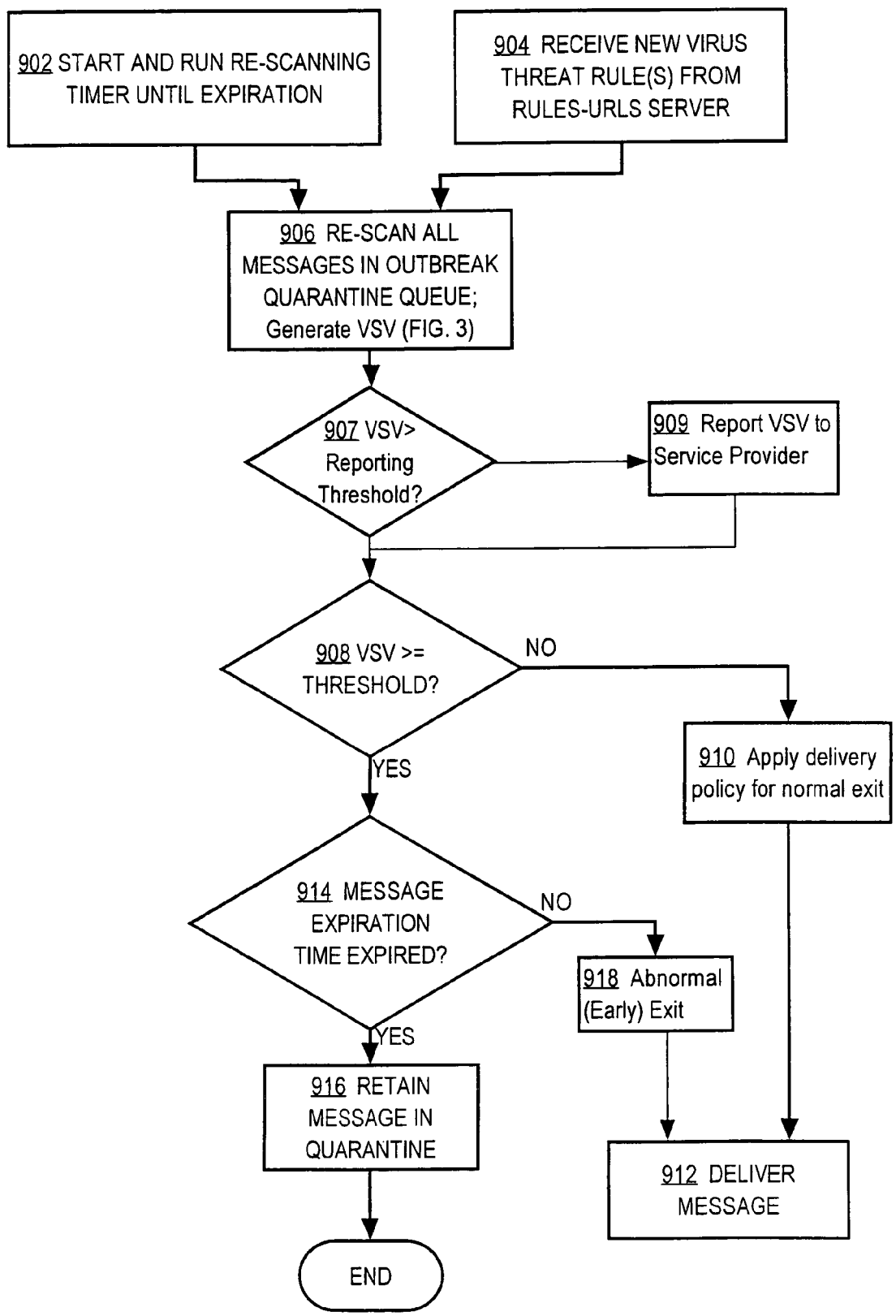
FIG. 9 is a flow diagram of an approach for rescanning messages that may contain viruses.

FIG. 9 is a flow diagram of an approach for rescanning messages that may contain viruses. According to an embodiment, when the TOC 710 releases new threat rules to messaging gateways 107, each messaging gateway rescans messages in its quarantine against the new rules. This approach offers the advantage that messages may be released from the quarantine earlier, because in later-stage processing the messages will be detected, using the new rules, as containing viruses. In this context, "release" refers to removing a message from quarantine and sending it to an anti-virus scanning process.

Alternatively, rescanning might reduce or increase the quarantine time of a message. This minimizes the number of messages in the quarantine and reduces the likelihood of releasing infected messages. Such inadvertent release could occur, for example, if the quarantine had a fixed release time, and the fixed release timer expired before an anti-virus vendor or other source released a virus definition that would trap the released message. In that scenario, a malicious message would be automatically released and downstream processing would not trap it.

In an embodiment, any of several events may trigger rescanning messages in a message quarantine. Further, the approach of FIG. 9 applies to processing messages that are in a quarantine as a result of viruses, spam, or other threats or undesired characteristics of messages. In step 902, a re-scanning timer is started and runs until expiration, and upon expiration re-scanning all messages in the quarantine queue is triggered at step 906.

Additionally or alternatively, in step 904, the messaging gateway 107 receives one or more new virus threat rules, anti-spam rules, URLs, scores, or other message classification information from Rules-URLs server 707. Receiving such information also can trigger re-scanning at step 906. The new rules, scores and other information are used in the re-scanning step to generate a new VSV for each message in the quarantine. For example, the TOC server 708 may publish, through rules-URL server 707, a set of rules for a virus outbreak that are initially broad, and later narrow the scope of the rules as more information about the outbreak becomes known. As a result, messages that matched the earlier rule set may not match the revised rules, and become known false positives. The approach herein attempts to release known false positives automatically in response to a rule update, without intervention by an administrator of messaging gateway 107.

In an embodiment, each message in the quarantine queue 316 has a stored time value indicating when the message entered the quarantine, and re-scanning at step 906 is performed in order of quarantine entry time, oldest message first.

In step 908, a test is performed to determine if the new VSV for a message is greater than or equal to a particular threshold value, as in step 312 of FIG. 3. The VSV threshold value is set by an administrator of a messaging gateway 107 to determine tolerance for quarantining messages. If the VSV is below the threshold, then the message probably can be released from the quarantine. Therefore control passes to step 910 at which a normal quarantine exit delivery policy is applied.

Optionally, in an embodiment, a messaging gateway 107 may implement a separate reporting threshold. When a message has a VSV that exceeds the reporting threshold, as tested at step 907, the messaging gateway 107 notifies the service provider 700 at step 909 and continues processing the message. Such notifications may provide important input to determining the occurrence of new virus outbreaks. In certain embodiments, such reporting is an aspect of "SenderBase Network Participation" (SBNP) and can be selectively enabled by an administrator using a configuration setting.

Applying a delivery policy at step 910 may comprise immediately queuing the message for delivery to a recipient in unmodified form, or stripping attachments, or performing content filtering, or performing other checks on the message. Applying a delivery policy may comprise adding an X-header to the message indicating a virus scan result. All applicable X-headers may be added to the message in the order in which actions occurred. Applying a delivery policy may comprise modifying a Subject line of the message to indicate the possible presence of a virus, spam or other threat. Applying a delivery policy may comprise redirecting the message to an alternate recipient, and storing an archived copy of the message for subsequent analysis by other logic, systems or persons.

In an embodiment, applying a delivery policy at step 910 comprises stripping all attachments from the message before delivering it when the message is in any of several quarantines and one quarantine determines that stripping attachments is the correct action. For example, a messaging gateway 107 may support a virus outbreak quarantine queue 316 and a separate quarantine queue that holds messages that appear to violate a policy of the gateway, such as the presence of disallowed words. Assume that the virus outbreak quarantine queue 316 is configured to strip attachments upon overflow before delivery. Assume the message is in both the virus outbreak quarantine queue 316 and the separate policy quarantine queue, and happens to overflow the virus outbreak quarantine queue 316. If an administrator then manually releases the same message from the policy quarantine queue, then the attachments are stripped again before delivery.

At step 912, the message is delivered.

If the test of step 909 is true, then the message is problematic and probably needs to be retained in the quarantine.

Optionally, each message may be assigned an expiration time value, and the expiration time value is stored in a database of messaging gateway 107 in association with quarantine queue 316. In an embodiment, the expiration time value is equal to the time at which the message entered the quarantine queue 316 and a specified retention time. The expiration time value may vary based upon message contents or heuristics of a message.

In step 914 a test is performed to determine if the message expiration time has expired. If so, then the message is removed from the quarantine, but the removal of a message at that point is deemed an abnormal or early exit, and therefore an abnormal exit delivery policy is applied at step 918. Thereafter the message can be delivered in step 912 subject to the delivery policy of step 918. The delivery policy that is applied at step 918 may be different than the policy that is applied at step 910. For example, the policy of step 910 could provide for unrestricted delivery, whereas at step 918 (for delivery of messages that are suspect, but have been in the quarantine for longer than the expiration time) removing attachments could be required.

If the message time has not expired at step 914, then the message is retained in the quarantine as shown at step 916. If the rule that causes the VSV to exceed the threshold changes, then the rule name and description are updated in the message database.

In various embodiments, different steps of FIG. 9 may cause the messaging gateway 107 to send one or more alert messages to an administrator or to specified user accounts or groups. For example, alerts can be generated at steps 904, 912 or 916. Example alert events include reaching specified quarantine fill levels or space limits; quarantine overflow; receiving a new outbreak rule, e.g. a rule that if matched sets a VSV higher than the quarantine threshold value that is configured in the messaging gateway; receiving information removing an outbreak rule; and a failure in an attempt to update new rules in the messaging gateway. Information removing an outbreak rule may comprise receiving a new rule that reduces a threat level of a particular type of message below the quarantine threshold value that is configured in the messaging gateway.

Further, different steps of FIG. 9 may cause the messaging gateway 107 to write one or more log entries in log file 113 describing actions that were performed. For example, log file entries can be written when messages are released abnormally or in an early exit. Alerts or log entries can be sent or written as the quarantine fills at specified levels. For example, alerts or log entries are sent or written when the quarantine reaches 5% full, 50% full, 75% full, etc. Log entries may include quarantine receipt time, quarantine exit time, quarantine exit criteria, quarantine exit actions, number of messages in quarantine, etc.

In other embodiments, alert messages can indicate scanning engine update failures; rule update failures; failure to receive a rule update in a specified time period; rejection of a specified percentage of messages; rejection of a specified number of messages; etc.

Figure 10:
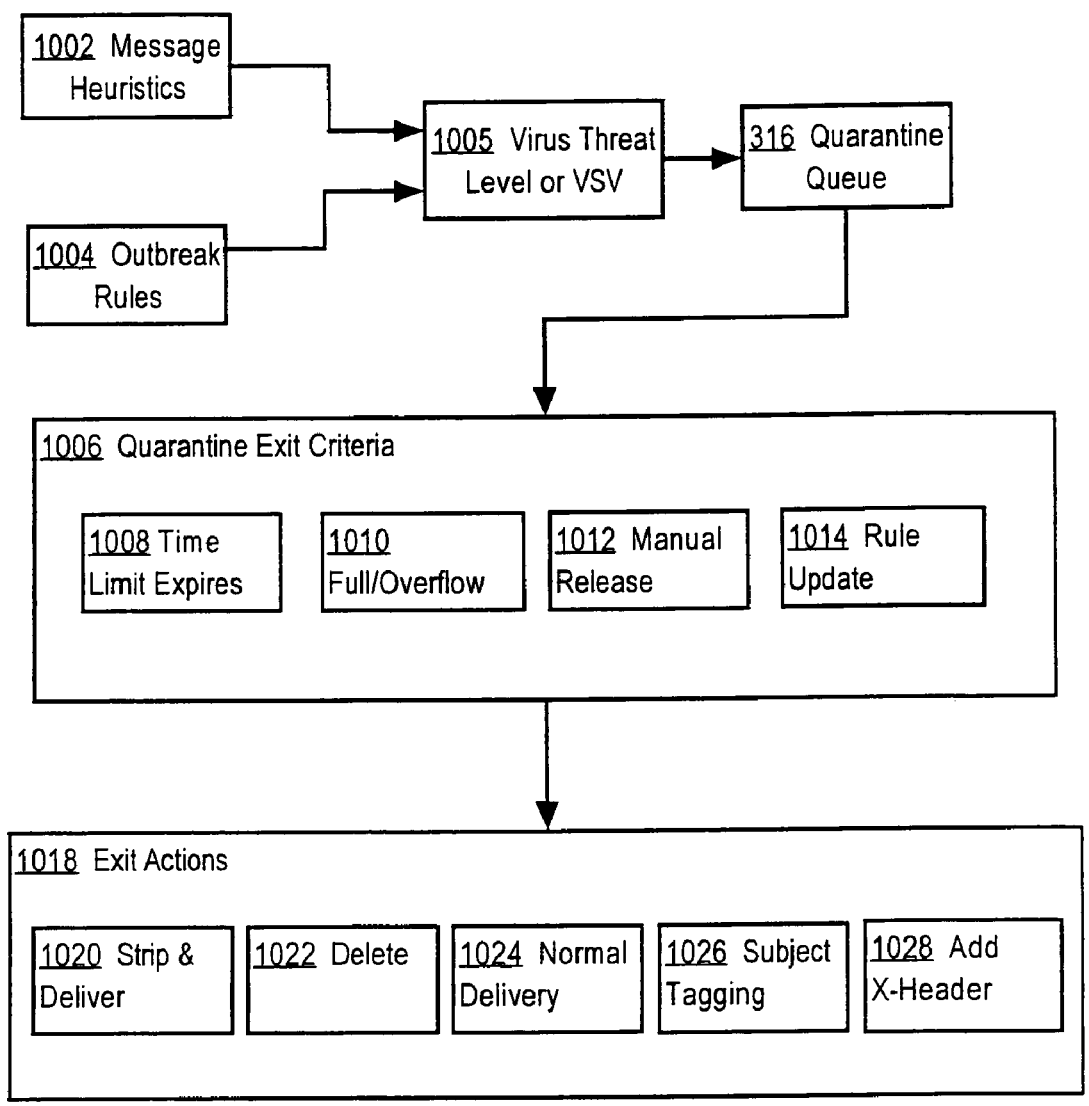
FIG. 10 is a block diagram of message flow model in a messaging gateway that implements the logic described above.

FIG. 10 is a block diagram of message flow model in a messaging gateway that implements the logic described above. Message heuristics 1002 and virus outbreak rules 1004 are provided to a scanning engine, such as anti-virus checker 116, which generates a VSV value or virus threat level (VTL) value 1005. If the VSV value exceeds a specified threshold, messages enter quarantine 316.

A plurality of exit criteria 1006 can enable a message to leave the quarantine 316. Example exit criteria 1006 include expiration of a time limit 1008, overflow 1010, manual release 1012, or a rule update 1014. When an exit criteria 1006 is satisfied, one or more exit actions 1018 then occur. Example exit actions 1018 include strip and deliver 1020, delete 1022, normal delivery 1024, tagging the message subject with keywords (e.g., [SPAM]) 1026, and adding an X-header 1028. In another embodiment, exit actions can include altering the specified recipient of the message.

In one embodiment, messaging gateway 107 maintains a data structure that defines, for each sending host associated with a message, policies for acting on messages received from that host. For example, a Host Access Table comprises a Boolean attribute value indicating whether to perform for that host virus outbreak scanning as described herein for FIG. 3, FIG. 9.

Further, each message processed in messaging gateway 107 may be stored in a data structure that carries metadata indicating what message processing to perform within the messaging gateway. Examples of metadata include: the VSV value of the message; the name of the rule that resulted in the VSV value and the corresponding rule description; the message quarantine time and overflow priority; flags to specify whether to perform anti-spam and anti-virus scanning and virus outbreak scanning; and a flag to enable content filters to be bypassed.

In an embodiment, a set of configuration information stored in messaging gateway 107 specifies additional program behavior for virus outbreak scanning for each potential recipient of a message from the gateway. Since messaging gateway 107 typically controls message traffic to a finite set of users, e.g., employees, contractors or other users in an enterprise private network, such configuration information may be managed for all potential recipients. For example, a per-recipient configuration value may specify a list of message attachment file extension types (".doc", ".ppt", etc.) that are excluded from consideration by the scanning described herein, and a value indicating that a message should not be quarantined. In an embodiment, the configuration information can include a particular threshold value for each recipient. Thus, the tests of step 312 and step 908 may have a different outcome for different recipients depending upon the associated threshold values.

Messaging gateway 107 may also manage a database table that counts messages that have been filtered using the techniques of FIG. 3, FIG. 9, the VSV of such messages, and a count of messages that were sent to the message quarantine 316.

In one embodiment, each message quarantine 316 has a plurality of associated programmatic actions that control how messages exit the quarantine. Referring again to FIG. 3, exit actions may include manual release of a message from the message quarantine 316 based on operator decision 318. Exit actions may include automatic release of a message from the message quarantine 316 when an expiration timer expires, as in FIG. 9. Exit actions may include an early exit from the message quarantine 316 when the quarantine is full, as an implementation of overflow policy 322. "Early exit" refers to prematurely releasing a message before the end of an expiration time value associated with the message based on a resource limitation such as queue overflow.

Normal message exit actions and early exit actions may be organized as a primary action and a secondary action of the type described above for delivery policy step 910. Primary actions may include Bounce, Delete, Strip Attachments and Deliver, and Deliver. Secondary actions may include Subject tag, X-header, Redirect, or Archive. The secondary actions are not associated with a primary action of Delete. In an embodiment, the secondary action of Redirect enables sending messages to a secondary "off box" quarantine queue that is hosted at corpus server cluster 706 or another element within service provider 700 rather than on the messaging gateway 107. This approach enables TI team 710 to examine quarantined messages.

In an embodiment, early exit actions from the quarantine resulting from quarantine queue overflow may include any of the primary actions, including Strip Attachments and Deliver. Any of the secondary actions may be used for such early exit. An administrator of the messaging gateway 107 may select the primary action and the secondary action for use upon early exit by issuing a configuration command to the messaging gateway using a command interface or GUI. Additionally or alternatively, message heuristics determined as a result of performing anti-virus scanning or other message scanning may cause different early exit actions to be performed in response.

In an embodiment, a local database in messaging gateway 107 stores names of file attachments of received messages that are in the message quarantine 316, and the size of the file attachment.

Re-scanning at step 906 may occur for a particular message in response to other actions of the messaging gateway 107. In an embodiment, messaging gateway 107 implements a content filter that can change the content of a received message according to one or more rules. If a content filter changes the content of a received message that was previously scanned for viruses, then the VSV value of that message could change upon re-scanning. For example, if the content filter strips attachments from the message, and a virus was in an attachment, the stripped message may no longer have a virus threat. Therefore, in an embodiment, when a content filter changes the content of a received message, re-scanning at step 906 is performed.

In an embodiment, an administrator of messaging gateway 107 can search the contents of quarantine 316 using console commands or other user interface commands. In an embodiment, searches can be performed based on attachment names, attachment types, attachment size, and other message attributes. In an embodiment, searching by file type can be performed only on messages that are in quarantine 316 and not in a policy quarantine or other quarantine, because such searching requires a scan of the message body that may negatively impact performance. In an embodiment, the administrator can display the contents of the virus outbreak quarantine 316 in a sorted order according to any of the foregoing attributes.

In an embodiment, when messages are placed in quarantine 316 through the process of FIG. 3 or FIG. 9, the messaging gateway 107 automatically displays a view of the virus outbreak quarantine. In an embodiment, the view includes for each message in the quarantine the following attribute values: outbreak identifier or rule name; sender name; sender domain; recipient name; recipient domain; subject name; attachment name; attachment type; attachment size; VSV; quarantine entry time; quarantine remaining time.

In an embodiment, messaging gateway 107 stores a reinsertion key, comprising an optional unique text string that can be associated with messages that have been manually released from the quarantine 316. When a released message has a reinsertion key associated therewith, the released message cannot be quarantined again during subsequent processing in messaging gateway 107 prior to delivery.

4.4 Fine-Grained Rules

Message rules are abstract statements, which if matched in comparison to a message in the anti-spam logic 119, result in a higher spam score. Rules may have rule types. Example rule types include compromised host, suspected spam source, header characteristics, body characteristics, URI, and learning. In an embodiment, specific outbreak rules can be applied. For example, a virus outbreak detection mechanism might determine that a certain type of message with a ZIP file attachment of 20 kb in size represents a virus. The mechanism can create a rule under which customer messaging gateways 107 will quarantine messages with 20 kb ZIP attachments, but not messages with 1 MB ZIP attachments. As a result, fewer false quarantine operations occur.

In an embodiment, virus information logic 114 comprises logic that supports establishing rules or tests on message headers and message bodies to identify fixed strings or regular expressions. For example, an embodiment permits defining the following rules:

head X_MIME_FOO X-Mime=~/foo/
head SUBJECT_YOUR Subject=~/your document/
body HEY_PAL /hey pal|long time, no see/
body ZIP_PASSWORD /\.zip password is/i In an embodiment, function tests can test specific aspects of a message. Each function executes custom code to examine messages, information already captured about messages, etc. The tests cannot be formed using simple logical combinations of generic header or body tests. For example, an effective test for matching viruses without examining file content is comparing the extension of the "filename" or "name" MIME field to the claimed MIME Content-Type. If the extension is "doc" and the Content-Type is neither application/octet-stream nor application/.*word, then the content is suspicious. Similar comparisons can be performed for PowerPoint, Excel, image files, text files, and executables.

Other examples of tests include: testing whether the first line of base64-type content matches the regular expression /^TV[nopqr]/ indicating a Microsoft executable; testing whether email priority is set to High, but there is no X-Mailer or User-Agent header; testing whether the message is multipart/alternative, but alternative parts are very different in content; testing whether the message is multipart, but contains only HTML text; looking for specific MIME boundary formats for new outbreaks.

In an embodiment, virus information logic 114 comprises logic that supports establishing meta-rules that comprise a plurality of linked rules. Examples include:

meta VIRUS_FOO ((SUBJECT_FOO1||SUBJECT_FOO2) && BODY_FOO)
meta VIRUS_BAR (SIZE_BAR+SUBJECT_BAR+BODY_BAR>2)

In an embodiment, virus information logic 114 comprises logic that supports establishing and testing messages against rules that are based upon file attachment size, file name keywords, encrypted files, message URLs, and anti-virus logic version values. In an embodiment, rules relating to file attachment size are established based on discrete values rather than every possible size value; for example, rules can specify file size in 1K increments for files from 0-5K; in 5K increments for files that are sized from 5K to 1 MB; and in 1 MB increments.

File name keyword rules match on a message when a file attachment to the message has a name that includes one or more keywords in the rules. Encrypted file rules test whether or not a file attachment is encrypted. Such rules may be useful to quarantine messages that have encrypted containers, such as encrypted ZIP files, as attachments to messages. Message URL rules match on a message when the message body contains one or more URLs specified in the rules. In an embodiment, a message is not scanned to identify URLs unless at least one message URL is installed in the system.

Rules based on anti-virus logic version values match a message when the messaging gateway 107 is running anti-virus logic having a matching version. For example, a rule may specify an AV signature version of "7.3.1" and would match on messages if a messaging gateway is running AV software with a signature file having that version number.

In an embodiment, a messaging gateway 107 automatically reduces a stored VSV for a message upon receiving a new rule that is more specific for a set of messages than a previously received rule. For example, assume that the TOC 708 initially distributes a rule that any message with a .ZIP file attachment is assigned VSV "3". The TOC 708 then distributes a rule that .ZIP file attachments between 30 KB and 35 KB have VSV "3". In response, messaging gateway 107 reduces the VSVs of all messages with .ZIP attachments of different file sizes to a default VSV, e.g., "1".

In an embodiment, anti-spam logic 119 can learn to identify legitimate email specific to an organization based on outbound message characteristics such as recipient addresses, recipient domains and frequently used words or phrases. In this context, an outbound message is a message composed by a user account associated with computers 120A, 120B, 120C on private network 110 and directed through messaging gateway 107 to a recipient account that is logically outside the messaging gateway. Such a recipient account typically is on a computer that is connected to public network 102. Since all outbound messages pass through messaging gateway 107 before delivery into network 102, and such outbound messages are nearly never spam, the messaging gateway can scan such messages and automatically generate heuristics or rules that are associated with non-spam messages. In an embodiment, learning is accomplished by training a Bayesian filter in anti-spam logic 119 on the text of outbound messages, and then using the Bayesian filter to test inbound messages. If the trained Bayesian filter returns a high probability, then the inbound message probably is not spam according to the probability that the outbound messages are not spam.

In an embodiment, messaging gateway 107 periodically polls the rules-URLs server 707 to request any available rule updates. HTTPS may be used to deliver rule updates. In an embodiment, an administrator of messaging gateway 107 can access and examine rule updates by entering URLs of the rule updates and connecting to rules-URLs server 707 using a browser and a proxy server or fixed address. An administrator can then delivery the updates to selected messaging gateways 107 within a managed network. Receiving a rule update may comprise displaying a user notification in an interface of messaging gateway 107, or writing an entry in log file 113 stating that a rule update was received or that the messaging gateway successfully connected to the rules-URLs server 707.

4.5 Communication with Service Provider

Customer messaging gateways 107 in FIG. 1 may implement a "phone home" or "SenderBase Network Participation" service in which the messaging gateways 107 can open connections to the service provider 700 and provide information about the messages that the messaging gateways 107 have processed, so that such information from the field can be added to the corpus and otherwise used at the service provider to improve scoring, outbreak detection, and heuristics.

In one embodiment, a tree data structure and processing algorithm are used to provide efficient data communication from messaging gateways 107 to the service provider.

Data from service provider generated as part of anti-spam and anti-virus checks is sent to messaging gateways 107 in the field. As a result, the service provider creates metadata describing what data the service provider wants the messaging gateways 107 to return to the service provider. The messaging gateways 107 collate data matching the metadata for a period of time, e.g., 5 minutes. The messaging gateways 107 then connect back to the service provider and provide field data according to the specifications of the metadata.

In this approach, defining and delivering different metadata to the messaging gateways 107 at different times enables the service provider to instruct the messaging gateways 107 in the field to deliver different data back to the service provider. Thus, the "phone home" service becomes extensible at the direction of the service provider. No update to software at the MGA is required.

In one implementation, a tree is implemented as a hash of hashes. A standard mapping of nested hashes (or dictionaries in Python) to trees existed. Certain nodes are named in a way that the data returns from the MGA about which things are which. By naming nodes in the tree, rather than describing things solely based on their position, the MGA does not need to know what the service provider will do with the data. The MGA merely needs to locate the correct data by name, and send a copy of the data back to the service provider. The only thing the MGA needs to know is the type of the data, that is, whether the data is a numeric value or string. The MGA does not need to perform computations or transformations of the data to suit the service provider.

Constraints are placed on the structure of the data. Rules are that endpoints of the tree are always one of two things. If the target data is a number, then the leaf node is a counter. When the MGA sees the next message that comes through, it increments or decrements the counter for that node. If the target data is a string, then the leaf node is overwritten with that string value.

Using the counter approach, any form of data can be communicated. For example, if the MGA needs to communicate an average score value back to the service provider, rather than having the service provider inform the MGA that the service provider wants the MGA to return a particular value as an average score, two counters are used, one for the top value and one for the bottom value. The MGA need not know which is which. It simply counts the prescribed values and returns them. Logic at the service provider knows that the values received from the MGA are counters and need to be averaged and stored.

Thus, this approach provides a method for transparent collation and transfer of data in which the device transferring the data does not know the specific use of the data, but can collate and provide the data. Further, the service provider can update its software to request additional values from messaging gateways 107, but no update to the MGA software is required. This enables the service provider to collect data without having to change hundreds or thousands of messaging gateways 107 in the field.

Example data that can be communicated from a messaging gateway 107 to service provider 700 includes X-header values containing obfuscated rules that matched on a particular message and resulted in a spam verdict.

4.7 Outbound Whitelist Module

In the configuration of FIG. 3, customer messaging gateways 107 can be deployed in a customer network so that they receive and process both inbound and outbound message traffic. Therefore, a messaging gateway 107 can be configured with an outbound message whitelist. In this approach, the destination network addresses of designated messages leaving the messaging gateway 107 are placed in an outbound message whitelist with a weight value. The outbound message whitelist is consulted when an inbound message is received, and inbound messages having source network addresses in the outbound whitelist are delivered if the weight value is appropriate. That is, the weight value is considered in determining if the message should be delivered; the presence of an address in the outbound whitelist does not necessarily mandate delivery. The rationale is that a message received from an entity in the outbound whitelist should not be spam or threatening, because sending a message to that entity implicitly indicates trust. The outbound whitelist may be maintained at the service provider for distribution to other customer messaging gateways 107.

Determining weight values may be performed with several approaches. For example, a destination address can be processed using a reputation scoring system, and a weight value can be selected based on the resulting reputation score. Message identifiers can be tracked and compared to determine if an inbound message is actually replying to a prior message that was sent. A cache of message identifiers may be used. Thus, if the Reply-To header contains a message identifier of a message previously sent by the same messaging gateway 107, then it is likely that the reply is not spam or a threat.

5.0 Implementation Mechanisms

Hardware Overview

The approach for managing computer virus outbreaks described herein may be implemented in a variety of ways and the invention is not limited to any particular implementation. The approach may be integrated into a electronic mail system or a mail gateway appliance or other suitable device, or may be implemented as a stand-alone mechanism. Furthermore, the approach may be implemented in computer software, hardware, or a combination thereof.

Figure 6:
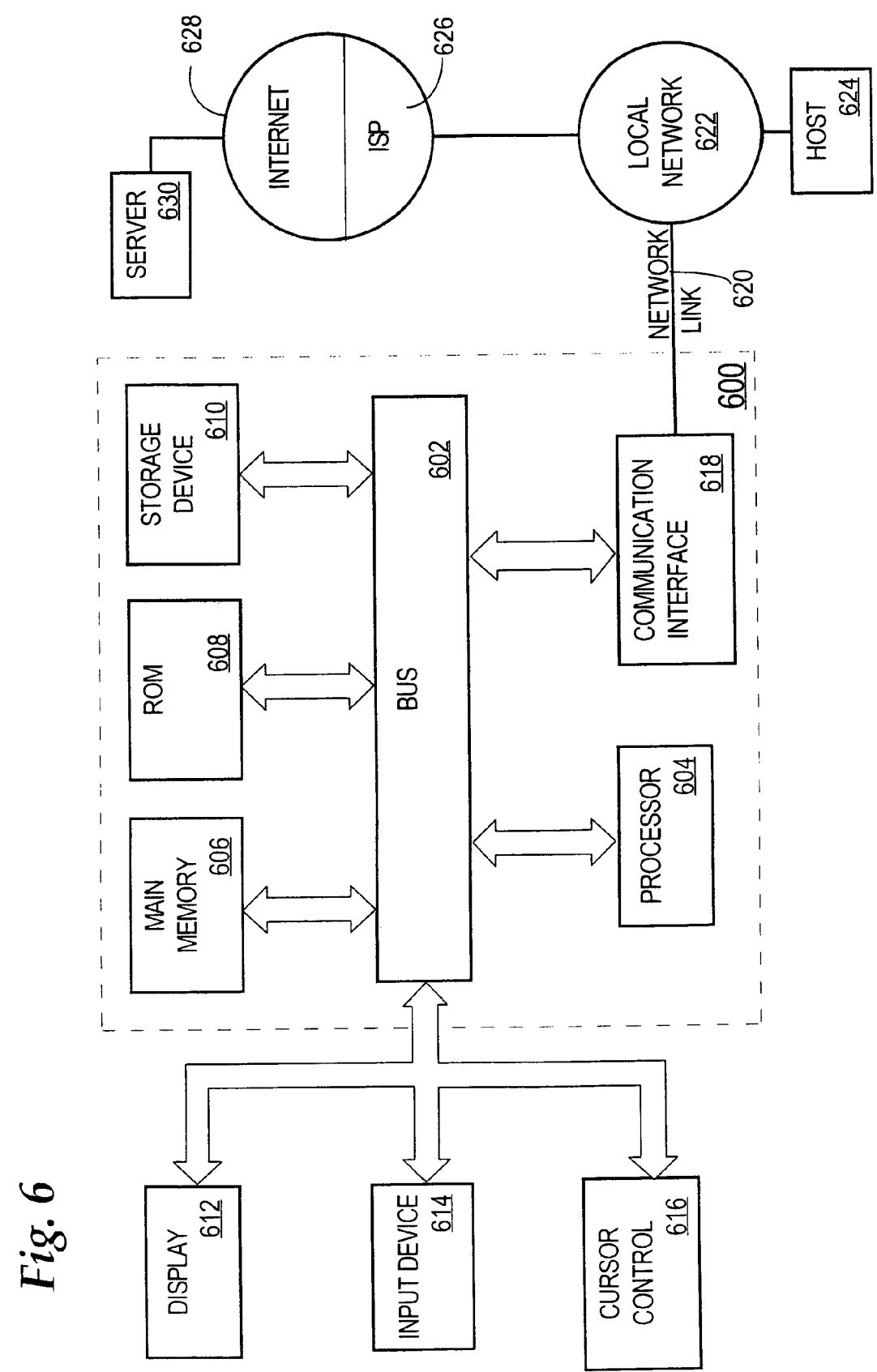
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for applying heuristic tests to message content, managing a dynamic threat quarantine queue, and message scanning with early exit from parsing and scanning. According to one embodiment of the invention, applying heuristic tests to message content, managing a dynamic threat quarantine queue, and message scanning with early exit from parsing and scanning is provided by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for applying heuristic tests to message content, managing a dynamic threat quarantine queue, and message scanning with early exit from parsing and scanning as described herein.

Processor 604 may execute the received code as it is received, and/or stored in storage device 610, or other non-volatile storage for later execution. In this manner, computer system 600 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. An apparatus, comprising:
   a network interface;
   one or more processors coupled to the network interface;
   logic coupled to the one or more processors which, when executed by the one or more processors, causes the one or more processors to perform:
   receiving and storing a plurality of rules specifying one or more criteria for electronic messages that indicate threats associated with the messages,
      wherein each rule has a priority value,
      wherein each rule is associated with a message element type, and
      wherein each rule has a weight proportional to a number of criteria specified in the rule;
   receiving an electronic mail message having a destination address for a recipient account, wherein the message comprises a plurality of message elements;
   extracting a first message element;
   determining a set of matching rules for the message by matching only the first message element to only selected rules having a message element type corresponding to the first message element, and according to an order of the priorities of the selected rules;
   computing a threat score value as a weighted average value of virus score values returned by each rule from the set of matching rules, by computing a first sum of products of each of the virus score values returned by the matching rules multiplied by the weight associated with the matching rule, and dividing the first sum by a second sum of the weights associated with the matching rules;
   when the threat score value is greater than a specified threshold, outputting the threat score value.

2. An apparatus, comprising:
   a processor;
   a computer-readable storage medium storing one or more stored sequences of instructions causing the processors to provide:
   means for receiving and storing a plurality of rules specifying one or more criteria for electronic messages that indicate threats associated with the messages,
      wherein each rule has a priority value,
      wherein each rule is associated with a message element type, and
      wherein each rule has a weight proportional to a number of criteria specified in the rule;
   means for receiving an electronic mail message having a destination address for a recipient account, wherein the message comprises a plurality of message elements;
   means for extracting a first message element;
   means for determining a set of matching rules for the message by matching only the first message element to only selected rules having a message element type corresponding to the first message element, and according to an order of the priorities of the selected rules;
   means for computing a threat score value as a weighted average value of virus score values returned by each rule from the set of matching rules, by computing a first sum of products of each of the virus score values returned by the matching rules multiplied by the weight associated with the matching rule, and dividing the first sum by a second sum of the weights associated with the matching rules;
   means for outputting the threat score value when the threat score value is greater than a specified threshold.

3. The apparatus of claim 1 or 2, further comprising logic for determining an updated threat score value for the message by matching other message elements to other rules only when the threat score value is less than a specified threshold.

4. The apparatus of claim 1 or 2, wherein the message elements comprise one or more message headers, a message body, and one or more HTML elements in the message body.

5. The apparatus of claim 1 or 2, wherein the first message element comprises one or more message headers, the selected rules comprise only header rules, and the plurality of rules includes the header rules, raw body rules, and HTML body rules.

6. The apparatus of claim 1 or 2, further comprising logic for determining the threat score value for the message by matching only the first message element to only the selected rules having a message element type corresponding to the first message element, and according to an order of the priorities of the selected rules; after matching each rule among the selected rules, testing whether the threat score value is greater than the specified threshold; and when the threat score value is greater than a specified threshold, outputting the threat score value.

7. The apparatus of claim 1 or 2, further comprising logic for determining an updated threat score value for the message by decoding a body of the message and matching the body to one or more raw body rules only when the threat score value is less than a specified threshold.

8. The apparatus of claim 1 or 2, further comprising logic for determining an updated threat score value for the message by rendering markup language message elements and matching the rendered markup language message elements to one or more body rules only when the threat score value is less than a specified threshold.

9. The apparatus of claim 1 or 2, wherein the logic comprises an anti-spam scanning engine.

10. The apparatus of claim 1 or 2, wherein the threats comprise any one of a virus, spam, or a phishing attack.

11. A method, comprising:
a network interface;
one or more processors coupled to the network interface;
logic coupled to the one or more processors which, when executed by the one or more processors, causes the one or more processors to perform:
receiving and storing a plurality of rules specifying one or more criteria for electronic messages that indicate threats associated with the messages,
wherein each rule has a priority value,
wherein each rule is associated with a message element type, and
wherein each rule has a weight proportional to a number of criteria specified in the rule;
receiving an electronic mail message having a destination address for a recipient account, wherein the message comprises a plurality of message elements;
extracting a first message element;
determining a set of matching rules for the message by matching only the first message element to only selected rules having a message element type corresponding to the first message element, and according to an order of the priorities of the selected rules;
computing a threat score value as a weighted average value of virus score values returned by each rule from the set of matching rules, by computing a first sum of products of each of the virus score values returned by the matching rules multiplied by the weight associated with the matching rule, and dividing the first sum by a second sum of the weights associated with the matching rules;
when the threat score value is greater than a specified threshold, outputting the threat score value.

12. The method of claim 11, further comprising logic for determining an updated threat score value for the message by matching other message elements to other rules only when the threat score value is less than a specified threshold.

13. The method of claim 11, wherein the message elements comprise one or more message headers, a message body, and one or more HTML elements in the message body.

14. The method of claim 11, wherein the first message element comprises one or more message headers, the selected rules comprise only header rules, and the plurality of rules includes the header rules, raw body rules, and HTML body rules.

15. The method of claim 11, further comprising logic for determining the threat score value for the message by matching only the first message element to only the selected rules having a message element type corresponding to the first message element, and according to an order of the priorities of the selected rules; after matching each rule among the selected rules, testing whether the threat score value is greater than the specified threshold; and when the threat score value is greater than a specified threshold, outputting the threat score value.

16. The method of claim 11, further comprising logic for determining an updated threat score value for the message by decoding a body of the message and matching the body to one or more raw body rules only when the threat score value is less than a specified threshold.

17. The method of claim 11, further comprising logic for determining an updated threat score value for the message by rendering markup language message elements and matching the rendered markup language message elements to one or more body rules only when the threat score value is less than a specified threshold.

18. The method of claim 11, wherein the logic comprises an anti-spam scanning engine.

19. The method of claim 11, wherein the threats comprise any one of a virus, spam, or a phishing attack.

* * * * *